US012754449B2

(12) United States Patent
Yu

(10) Patent No.: US 12,754,449 B2
(45) Date of Patent: Oct. 6, 2026

(54) BACKLIGHT MODULE AND METHOD FOR MANUFACTURING THE SAME, AND DISPLAY DEVICE

(71) Applicant: Shanghai Tianma Micro-Electronics Co., Ltd., Shanghai (CN)

(72) Inventor: Quanpeng Yu, Shanghai (CN)

(73) Assignee: Shanghai Tianma Microelectronics Co., Ltd., Shanghai (CN)

( * ) Notice: Subject to any disclaimer, the term of this patent is extended or adjusted under 35 U.S.C. 154(b) by 0 days.

(21) Appl. No.: 19/387,286

(22) Filed: Nov. 12, 2025

(65) Prior Publication Data

US 2026/0072306 A1 Mar. 12, 2026

(30) Foreign Application Priority Data

Jul. 11, 2025 (CN) ......................... 202510963326.2

(51) Int. Cl.
*G02F 1/00* (2006.01)
*G02F 1/1335* (2006.01)
*G02F 1/13357* (2006.01)

(52) U.S. Cl.
CPC .. *G02F 1/133603* (2013.01); *G02F 1/133612* (2021.01)

(58) Field of Classification Search
CPC ............................ G02F 1/133603; G02F 1/12
See application file for complete search history.

(56) References Cited

U.S. PATENT DOCUMENTS 9,698,308 B2 * 7/2017 Bower .................. H10W 90/00
12,487,490 B2 * 12/2025 Meng ................ G02F 1/133612
2020/0310198 A1 * 10/2020 Li ..................... G02F 1/133606
2022/0189896 A1 * 6/2022 Song .................... H05K 1/0306

FOREIGN PATENT DOCUMENTS

CN 118502155 A 8/2024

* cited by examiner

*Primary Examiner* — Gerald J Sufleta, II
(74) *Attorney, Agent, or Firm* — CHRISTENSEN O'CONNOR JOHNSON KINDNESS PLLC

(57) ABSTRACT

Provided are a backlight module, a manufacturing method thereof and a display device. The backlight module includes: a light-transmitting substrate; light sources and a first film layer located on a same side of the substrate; and a first metal layer located on a side of the first film layer away from the substrate. The light source includes a light-emitting surface and an electrode located on two opposite sides of the substrate. A distance between a surface of the first film layer away from the substrate and the substrate is greater than that between a surface of the electrode away from the substrate and the substrate. The first film layer is provided with a first recess, and the first recess exposes at least part of the electrode. The first metal layer includes a connection electrode, and the connection electrode is connected with the electrode in the first recess.

20 Claims, 13 Drawing Sheets

BACKLIGHT MODULE AND METHOD FOR MANUFACTURING THE SAME, AND DISPLAY DEVICE

CROSS-REFERENCE TO RELATED APPLICATIONS

The present application claims priority to Chinese Patent Application No. 202510963326.2, filed on Jul. 11, 2025, the content of which is incorporated herein by reference in its entirety.

TECHNICAL FIELD

The present disclosure relates to the field of display technologies and, in particular to a backlight module, a method for manufacturing the backlight module, and a display device.

BACKGROUND

A backlight module is one of core components of a liquid crystal display device, and its function is to provide a uniform and stable light for a liquid crystal display panel to ensure brightness, contrast, and color reproduction effects of a display image.

At present, backlight modules are divided into two types: edge-lit backlight modules and direct-lit backlight modules, where direct-lit backlight modules are widely used in various electronic devices due to their advantages such as high brightness. However, the existing direct-lit backlight modules have undesirable issues such as excessive thickness, which limits the performance optimization of the liquid crystal display device to some extent.

SUMMARY

Embodiments of the present disclosure provide a backlight module, a method for manufacturing the same and a display device, which is used for optimizing the structural design of the backlight module.

In a first aspect, embodiments of the present disclosure provide a back light module, including: a light-transmitting substrate; a plurality of light sources located on a side of the light-transmitting substrate, where the plurality of light sources respectively include a light-emitting surface and an electrode, and the electrode is located on a side of the light-emitting surface away from the light-transmitting substrate; a first film layer located on a same side of the light-transmitting substrate as the plurality of light sources, where a distance between a surface of the first film layer away from the light-transmitting substrate and the light-transmitting substrate is greater than a distance between a surface of the electrode away from the light-transmitting substrate and the light-transmitting substrate, the first film layer is provided with a first recess on a side away from the light-transmitting substrate, and at least part of the electrode is exposed by the first recess; and a first metal layer located on a side of the first film layer away from the light-transmitting substrate, where the first metal layer includes a connection electrode, and the connection electrode is electrically connected to the electrode in the first recess.

In a second aspect, based on the same inventive concept, embodiments of the present disclosure further provide a method for manufacturing a backlight module, used to form the backlight module described above. The method includes: providing light sources on a side of the light-transmitting substrate, where the light sources respectively include a light-emitting surface and an electrode, and the electrode is located on a side of the light-emitting surface away from the light-transmitting substrate; forming a first film layer on a same side of the light-transmitting substrate as the light sources, a distance between a surface of the first film layer away from the light-transmitting substrate and the light-transmitting substrate is greater than a distance between a surface of the electrode away from the light-transmitting substrate and the light-transmitting substrate, the first film layer is provided with a first recess on a side away from the light-transmitting substrate, and at least part of the electrode is exposed by the first recess; and forming a first metal layer on a side of the first film layer away from the light-transmitting substrate, where the first metal layer includes a connection electrode, and the connection electrode is electrically connected to the electrode of the light sources in the first recess.

In a third aspect, based on the same inventive concept, embodiments of the present disclosure further provide a display device, including a display panel and a backlight module. The back light module includes: a light-transmitting substrate; a plurality of light sources located on a side of the light-transmitting substrate, where the plurality of light sources respectively include a light-emitting surface and an electrode, and the electrode is located on a side of the light-emitting surface away from the light-transmitting substrate; a first film layer located on a same side of the light-transmitting substrate as the plurality of light sources, where a distance between a surface of the first film layer away from the light-transmitting substrate and the light-transmitting substrate is greater than a distance between a surface of the electrode away from the light-transmitting substrate and the light-transmitting substrate, the first film layer is provided with a first recess on a side away from the light-transmitting substrate, and at least part of the electrode is exposed by the first recess; and a first metal layer located on a side of the first film layer away from the light-transmitting substrate, where the first metal layer includes a connection electrode, and the connection electrode is electrically connected to the electrode in the first recess.

BRIEF DESCRIPTION OF DRAWINGS

In order to better illustrate the technical solutions in the embodiments of the present disclosure, the drawings used in the description of the embodiments will be briefly illustrated as follows. It should be noted that the drawings in the following description are merely some of, rather than all of the embodiments of the present disclosure. For those skilled in the art, other drawings can be obtained in accordance with these drawings without any creative efforts.

DESCRIPTION OF EMBODIMENTS

In order to better understand technical solutions of the present disclosure, embodiments of the present disclosure are described in detail below in conjunction with the drawings.

It should be clear that the described embodiments are only some rather than all of the embodiments of the present disclosure. All other embodiments obtained by those skilled in the art based on the embodiments of the present disclosure without creative efforts should fall within the protection scope of the present disclosure.

Terms used in the embodiments of the present disclosure are merely for the purpose of describing specific embodiments but not intended to limit the present disclosure. Singular forms of "a/an", "the" and "said" used in the embodiments of the present disclosure and the appended claims are also intended to include plural forms, unless clearly indicating others.

It should be understood that the term "and/or" used herein is merely an association relationship describing an associated object, and indicates that there may be three relationships, for example, A and/or B, and may indicate: only A, both A and B, and only B. In addition, the character "/" herein generally indicates an "or" relationship between the associated objects.

The embodiments of the present disclosure relate to a direct-lit backlight module, before describing the structure of the backlight module, the structure and the existing problems of a backlight module in the related art will be first described in the present disclosure.

Figure 1:
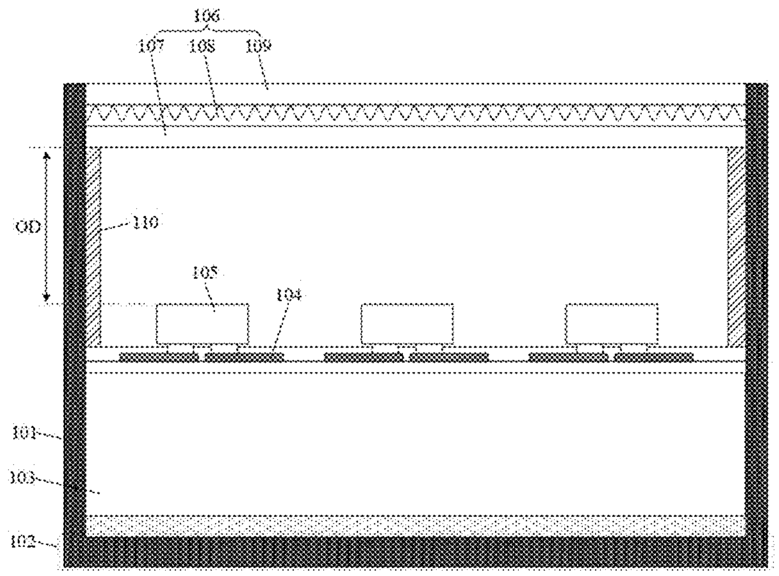
FIG. 1 is a schematic structural diagram of a backlight module in the related art.

FIG. 1 is a schematic structural diagram of a backlight module in the related art. As shown in FIG. 1, the direct-in backlight module in the related art includes a frame 101, and the frame 101 includes a bottom plate 102. The direct-in backlight module further includes a light-transmitting substrate 103 located on a side of the bottom plate 102, and a metal wire 104 located on a side of the light-transmitting substrate 103 away from the bottom plate 102, light sources 105, and an optical assembly 106, the optical assembly 106 may specifically include film sheets such as a diffusion film 107, a brightness enhancement film (BEF) 108, and a dual brightness enhancement film (DBEF) 109.

The light sources 105 belong to point light sources with concentrated light-emitting intensity, if light sources 105 are too close to the diffusion film 107, the light emitted by the light sources 105 is not sufficiently mixed before being received by the diffusion film 107, so that the brightness of the light sources 105 is higher.

Therefore, the existing direct-in backlight module further includes a support assembly 110, an optical distance OD is formed between the light sources 105 and the diffusion film 107 by using the support assembly 110, light emitted by the light sources 105 naturally diverges within the optical distance OD, and light in different directions is preliminarily mixed before reaching the diffusion film 107, and then the preliminarily diffused light is more uniformly scattered in cooperation with the diffusion film 107, so that the point light sources are converted into a uniform surface light source, which eliminates the brightness difference at different positions, and enhances the light uniformity effect of the backlight module.

However, it is difficult for the backlight module of this design to have a smaller module thickness while having the better light uniformity effect. For example, if it is desired to make the backlight module have the better light uniformity effect, the backlight module needs to have a large enough optical distance OD to ensure the light mixing degree, but this will undoubtedly lead to an increase in the overall thickness of the module. However, if it is desired to make the backlight module have a smaller module thickness, the optical distance OD needs to be reduced to weaken the light uniformity effect.

In this regard, embodiments of the present disclosure provide a backlight module, which can effectively overcome the above problems.

Figure 2:
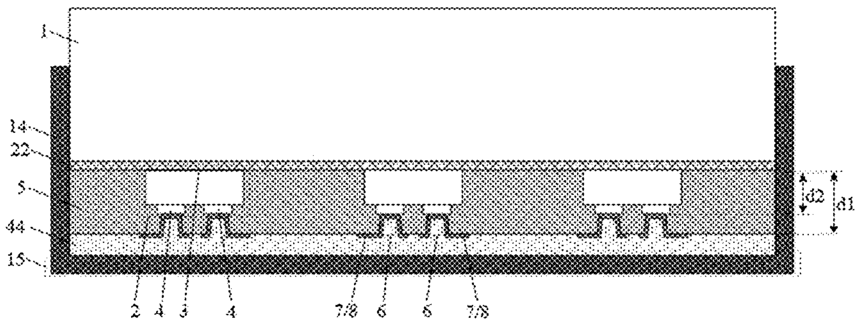
FIG. 2 is a schematic structural diagram of a backlight module according to an embodiment of the present disclosure.

FIG. 2 is a schematic structural diagram of a backlight module according to an embodiment of the present disclosure, and as shown in FIG. 2, the backlight module includes a light-transmitting substrate 1. The light-transmitting substrate 1 may specifically be a glass substrate, and the glass substrate has relatively high transmittance and has a rigid support function, which can improve module reliability.

The backlight module further includes a plurality of light sources 2 located on a side of the light-transmitting substrate 1, and the light sources 2 may be Light Emitting Diode (LED) chips, such as mini LEDs or micro LEDs. Each of the light sources 2 includes a light-emitting surface 3 and an electrode 4, and the electrode 4 is located on a side of the light-emitting surface 3 away from the light-transmitting substrate 1.

The backlight module has a light-emitting side, when the backlight module is applied to the display device, its light-emitting side faces the display panel. In order to realize normal light emission of the backlight module, the light-emitting surface 4 of the light source 2 in the backlight module facing the light-emitting side, and the electrode 4 of the light source 2 in the above structure is located on the side of the light-emitting surface 3 away from the light-transmitting substrate 1, that is, the light source 2 is located on a side of the light-transmitting substrate 1 away from the light-emitting side of the backlight module.

The backlight module further includes a first film layer 5, and the first film layer 5 and the light source 2 are located on a same side of the light-transmitting substrate 1, that is, on a side of the light-transmitting substrate 1 away from the light-emitting side of the backlight module. A distance d1 between a surface of the first film layer 5 away from the light-transmitting substrate 1 and the light-transmitting substrate 1 is greater than a distance d2 between a surface of the electrode 4 away from the light-transmitting substrate 1 and the light-transmitting substrate 1. That is, the surface of the first film layer 5 away from the light-transmitting substrate 1 is further away from the light-transmitting substrate 1. The first film layer 5 may serve as a planarization layer, the first film layer 5 covers at least part of the light source 2 and surrounds the light source 2. A first recess 6 is provided on a side of the first film layer 5 away from the light-transmitting substrate 1, the first recess 6 is recessed toward the light-transmitting substrate 1, and the first recess 6 exposes at least part of the electrode 4.

The backlight module further includes a first metal layer 7, and the first metal layer 7 is located on a side of the first film layer 5 away from the light-transmitting substrate 1. The first metal layer 7 includes a connection electrode 8, and the connection electrode 8 is electrically connected to the electrode 4 in the first recess 6.

Figure 3:
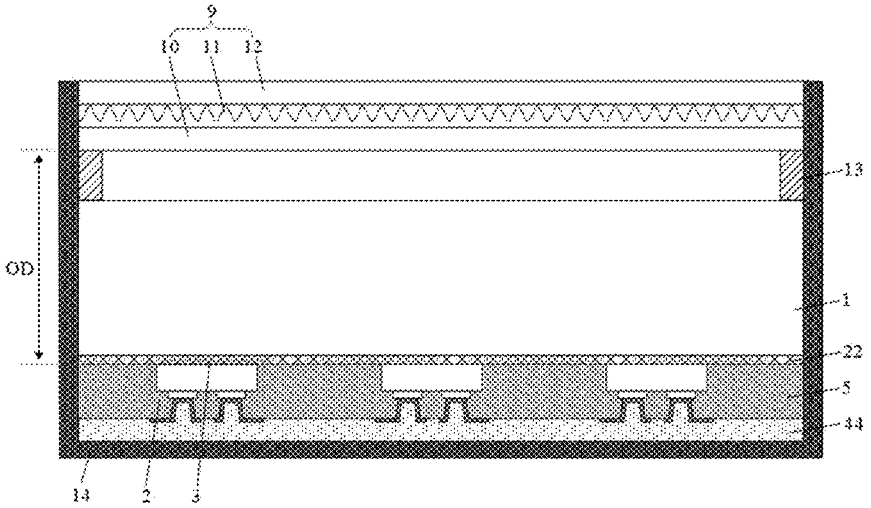
FIG. 3 is another schematic structural diagram of a backlight module according to an embodiment of the present disclosure.
Figure 4:
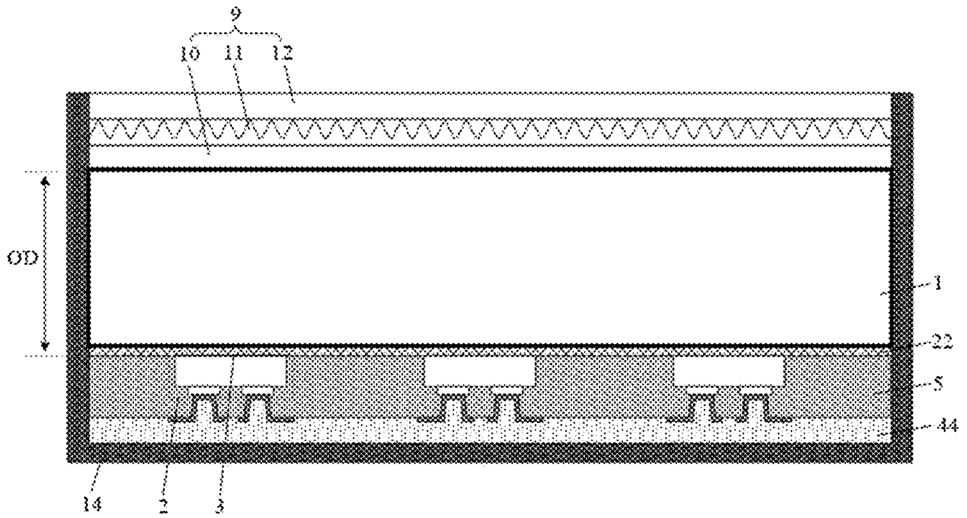
FIG. 4 is another schematic structural diagram of a backlight module according to an embodiment of the present disclosure.

In some embodiments, by adjusting the relative position relationship between the light-transmitting substrate 1 and the light source 2, the light-transmitting substrate 1 is located on a side of the light source 2 facing the light-emitting side of the backlight module, that is, the light-transmitting substrate 1 is located above the light source 2. Referring to FIG. 3 and FIG. 4, the thickness of the light-transmitting substrate 1 may be reused as at least part of the optical distance OD, and the part of the thickness that was originally occupied by the light-transmitting substrate 1 below the light source 2 may also be freed up.

In one case, the optical distance OD is unchanged, and on the premise of ensuring that the backlight module has the better light uniformity effect, the freed up thickness can be completely used to reduce the thickness of the module, so that the module achieves a thinner design. Alternatively, part of the freed up thickness is used to reduce the thickness of the module, and another part of the thickness is used to increase the optical distance OD, so that the optical distance OD is larger while the module is thinned, and the light uniformity effect of the backlight module is better. That is, by adopting the technical solution provided by the embodiments of the present disclosure, the backlight module can achieve better light uniformity effect and thinning effect.

In some embodiments, the backlight module further includes an optical assembly 9, the optical assembly 9 is located on a side of the light-transmitting substrate 1 away from the light source 2, and may specifically include a diffusion film 10, a brightness enhancement film 11, a dual brightness enhancement film 12, and the like.

When the thickness of the light-transmitting substrate 1 is reused as at least part of the optical distance OD, in one case, as shown in FIG. 3, which is another schematic structural diagram of a backlight module according to an embodiment of the present disclosure, a support assembly 13 may be further included between the light-transmitting substrate 1 and the optical assembly 9, and an air gap is formed between the optical assembly 9 and the light-transmitting substrate 1 by using the support assembly 13, at this time, the thickness of the light-transmitting substrate 1 and the height of the air gap together form the optical distance OD, for example, the optical distance OD ranges from 0.2 mm to 1.0 mm. However, it should be noted that since the support assembly 13 of the structure is only used to form part of the optical distance, and the support assembly 110 in the related art needs to be used to form the entire optical distance, the height of the support assembly 13 in the present disclosure is much smaller than the height of the support assembly 110 in the related art.

Alternatively, in another case, as shown in FIG. 4, which is another schematic structural diagram of a backlight module according to an embodiment of the present disclosure, if the thickness of the light-transmitting substrate 1 is sufficient to form an entire optical distance OD, no support assembly may be disposed between the light-transmitting substrate 1 and the optical assembly 9.

In addition, it can be understood that, referring to FIG. 2, the backlight module further includes a frame 14, the frame 14 includes a bottom plate 15, and the bottom plate 15 is located on a side of the first metal layer 7 away from the light-transmitting substrate 1. The frame 14 may specifically be an iron frame. The frame 14 is configured to implement functions such as supporting, fixing, and assisting heat dissipation, and the heat generated by the light source 2 can be conducted to the frame 14 and then dissipated.

Referring to FIG. 1, in the related art, the light-transmitting substrate 103 is spaced between the light source 105 and the bottom plate 102 of the frame 101, heat generated by the light source 105 needs to pass through the light-transmitting substrate 103 to be conducted to the bottom plate 102, and the light-transmitting substrate 103 is generally thicker, which results in poor heat dissipation capability of the backlight module.

In some embodiments, the light source 2 and the bottom plate 15 of the frame 14 are no longer separated by the light-transmitting substrate 1, the first film layer 5 and the first metal layer 7 separated between the light source 2 and the bottom plate 15 are only film structures, and their thicknesses are much smaller than the thickness of the substrate. The heat generated by the light source 2 only needs to transmit a short distance downward to be conducted to the bottom plate 15, and then dissipated through the frame 14, which improves heat dissipation efficiency, enables the backlight module to achieve better heat dissipation performance.

Figure 5:
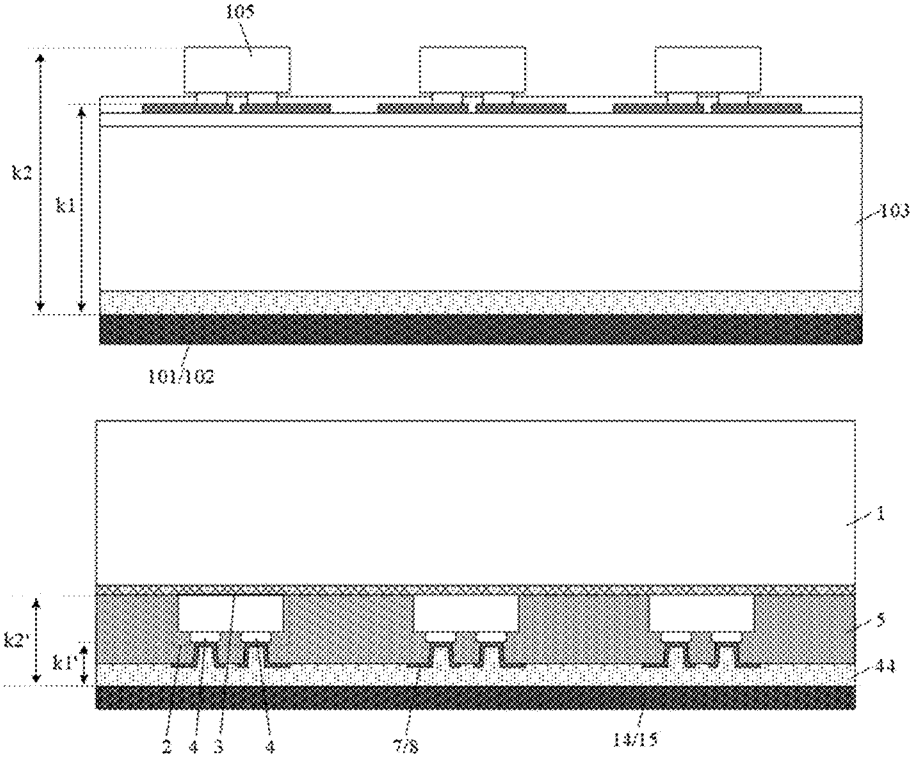
FIG. 5 is a schematic diagram comparing a distance between a light-emitting element and a frame in an embodiment of the present disclosure with that in the related art.

In some embodiments, as shown in FIG. 5, which is a schematic diagram comparing a distance between a light-emitting element and a frame 14 in an embodiment of the present disclosure with that in the related art, in the related art, a distance k1 between an electrode of a light source 105 and a bottom plate 102 usually ranges from 0.3 mm to 1.2 mm, and a distance k2 between a light-emitting surface of the light source 105 and the bottom plate 102 ranges from 0.4 mm to 1.6 mm. Whereas in the present disclosure, a distance k1' between the electrode 4 of the light source 2 and the bottom plate 15 may be reduced to 0.05 mm to 0.2 mm, and the distance k2' between the light-emitting surface 3 of the light source 2 and the bottom plate 15 may be reduced to 0.15 mm to 0.6 mm.

In addition, it should be noted that the light-transmitting substrate 1 is usually a glass substrate, for example, a high-transmittance glass substrate, and the glass substrate has very excellent light transmittance. Even if the light-transmitting substrate 1 is located on the light-emitting side of the light source 2, it will not affect the normal light emission.

Figure 6:
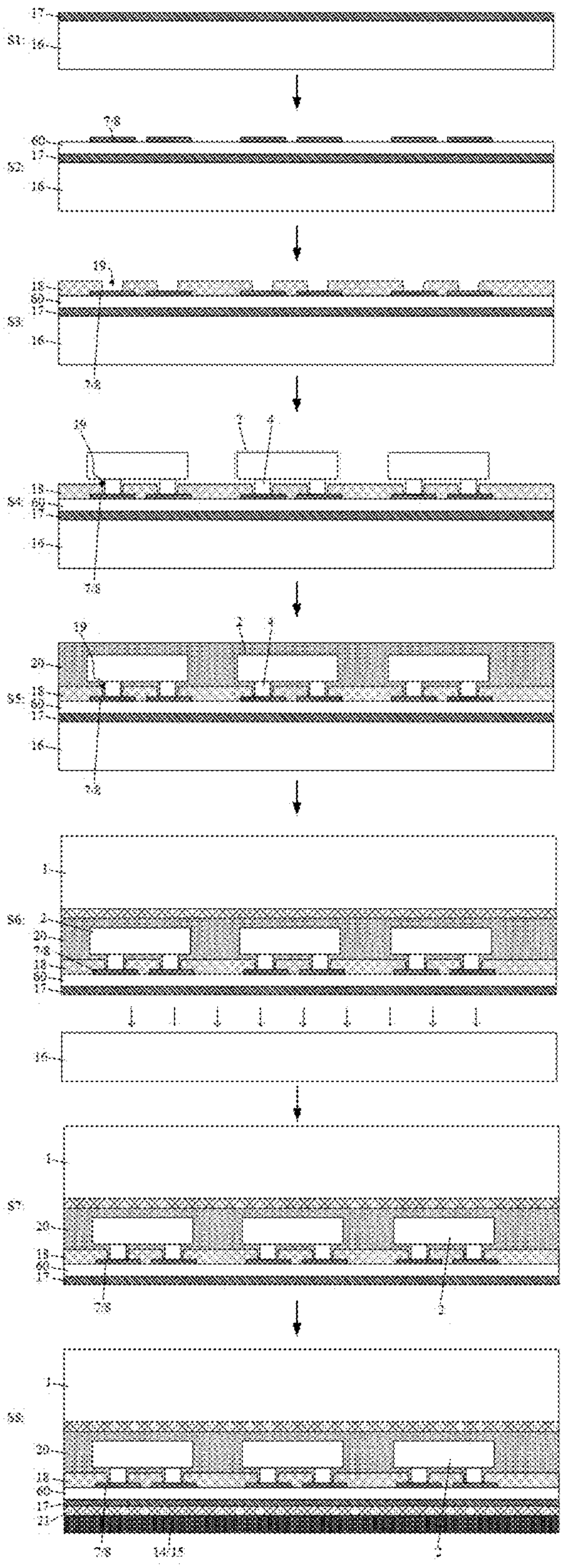
FIG. 6 is a process flowchart of a backlight module according to an embodiment of the present disclosure.

When the light source 2 is disposed on the side of the light-transmitting substrate 1 away from the light-emitting side of the backlight module, in some embodiments, as shown in FIG. 6, which is a process flowchart of a backlight module according to an embodiment of the present disclosure, the manufacturing process of the backlight module includes the following steps.

S1: providing a carrier substrate 16 and forming a peeling layer 17 on a side of the carrier substrate 16, where the carrier substrate 16 may also be a glass substrate.

S2: forming a first insulating layer 60 and a first metal layer 7 on a side of the peeling layer 17, where the first metal layer 7 is located on a side of the first insulating layer 60 away from the peeling layer 17, and the first metal layer 7 includes a connection electrode 8.

S3: forming a second insulating layer 18 on the first metal layer 7, where the second insulating layer 18 has an opening 19, and the opening 19 serves as a connection via hole to expose at least part of the connection electrode 8.

S4: transferring the light source 2, so that the electrode 4 of the light source 2 is electrically connected to the connection electrode 8 through the opening 19.

S5: forming a third insulating layer 20 covering the light source 2, where the third insulating layer 20 encapsulates and protects the light source 2.

S6: bonding the light-transmitting substrate 1 and the third insulating layer 20, and removing the carrier substrate 16.

S7: forming an adhesive layer 21 on a side of the peeling layer 17 away from the light source 2.

S8: bonding a frame 14 on a side of the adhesive layer 21.

However, the carrier substrate 16 needs to be used in this implementation, and the carrier substrate 16 needs to be peeled off subsequently, which makes the process cumbersome and results in relatively high cost. Therefore, embodiments of the present disclosure provide the above structure having the first film layer 5.

Figure 7:
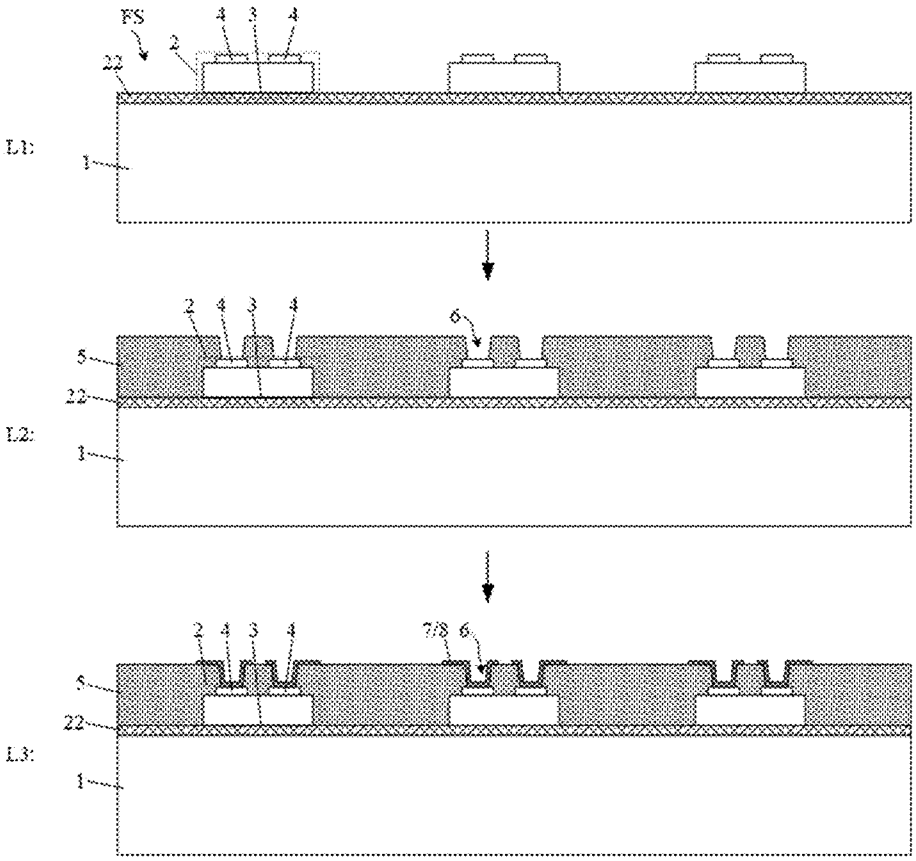
FIG. 7 is another process flowchart of a backlight module according to an embodiment of the present disclosure.

FIG. 7 is another process flowchart of a backlight module according to an embodiment of the present disclosure, and as shown in FIG. 7, the manufacturing process of the backlight module includes the following steps.

K1: boding an inverted light source 2 with the electrode 4 facing upward to a first side FS of a light-transmitting substrate 1, where the first side FS of the light-transmitting substrate 1 is upward, and the first side is a side of the light-transmitting substrate 1 facing away from the light-emitting side of the backlight module.

K2: forming a first film layer 5 having the first recess 6.

K3: forming a first metal layer 7, where a connection electrode 8 in the first metal layer 7 is electrically connected to the electrode 4 of the light source 2 through the first recess 6.

Subsequently, with reference to FIG. 25, after K3, the formed structure is bonded and fixed to the frame 14. Then, the formed structure is turned over so that the second side of the light-transmitting substrate 1 faces upward, and the support assembly 13 and an optical assembly 9 are disposed on the side of the light-transmitting substrate 1 away from the light source 2.

In this implementation, the light source 2 and the first film layer 5 are directly formed on the light-transmitting substrate 1 without using the carrier substrate 16, so that the glass process of the carrier substrate 16 is omitted, the process is simple and the cost is low.

In addition, it should be noted that the first recess 6 of the first film layer 5 in this implementation is different from the opening 19 of the second insulating layer 18 in the previous implementation.

On one hand, in the final backlight module structure, the opening 19 in the previous implementation is a recess of the second insulating layer 18 on a side adjacent to the light-transmitting substrate 1, and the recess is recessed in a direction away from the light-transmitting substrate 1. Whereas the first recess 6 in this implementation is a recess of the first film layer 5 on a side away from the light-transmitting substrate 1, and the recess is recessed toward the light-transmitting substrate 1.

On the other hand, the second insulating layer 18 in the previous implementation is formed earlier than the light source 2, and in order to realize the connection between the light source 2 and the connection electrode 8, the opening 19 in the second insulating layer 18 needs to be capable of completely accommodating the electrode 4, so that the electrode 4 can be completely placed in the opening 19 and in contact with the electrode 4 after the light source 2 is transferred. Therefore, in the same direction, the size of the opening 19 is larger than the size of the electrode 4.

Whereas the first film layer 5 in this implementation is formed later than the light source 2. In the manufacturing process, the electrode 4 of the light source 2 is used as a lower metal, the connection electrode 8 is used as an upper metal, and the first recess 6 is a connection via hole between the upper metal and the lower metal. Usually, to reduce the risk of short circuits, only part of the lower metal is exposed by such a connecting via hole, and the upper metal is recessed in the connecting via hole to connect with the lower metal. That is, in the same direction, the size of the first recess 6 is the size of the electrode 4 of the light source 2.

Figure 8:
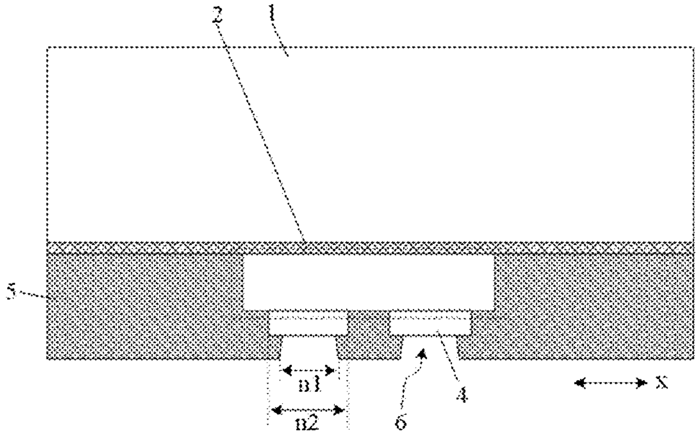
FIG. 8 is a schematic diagram of a size of a first recess in a backlight module according to an embodiment of the present disclosure.

That is, with respect to the first recess 6, in some embodiments, as shown in FIG. 8, which is a schematic diagram of a size of a first recess 6 in a backlight module according to an embodiment of the present disclosure, a width n1 of the first recess 6 in the first direction x is less than a width n2 of the electrode 4 in a first direction x, and the first direction x is parallel to a plane where the light-transmitting substrate 1 is located.

The width n1 of the first recess 6 in the first direction x may be understood as a maximum width of the first recess 6 in the first direction x.

Additionally/alternatively, in a direction perpendicular to the plane where the light-transmitting substrate 1 is located, a sidewall of the first recess 6 overlaps with the electrode 4.

The sidewall of the first recess 6 may be an inclined sidewall, that is, an angle between the sidewall of the first recess 6 and a surface of the first film layer 5 away from the light-transmitting substrate 1 is not equal to 90°. In a direction perpendicular to the plane where the light-transmitting substrate 1 is located, an orthographic projection of the side wall is a plane, and the plane overlaps with an orthographic projection of the electrode 4 of the light source 2.

Alternatively, the sidewall of the first recess 6 may also be a vertical sidewall, that is, the sidewall of the first recess 6 is perpendicular to the plane where the light-transmitting substrate 1 is located. In a direction perpendicular to the plane where the light-transmitting substrate 1 is located, an orthographic projection of the side wall is a line, and the line overlaps with an orthographic projection of the electrode 4 of the light source 2.

In this way, the first recess 6 can ensure the connection reliability between the connection electrode 8 and the light source 2 and reduce the risk of short circuits.

Referring again to FIG. 2, in some embodiments, a first adhesive layer 22 is included between the light source 2 and the light-transmitting substrate 1.

The first adhesive layer 22 may include a material such as an epoxy resin adhesive and is formed by a coating and curing process. Alternatively, the first adhesive layer 22 may also be an attached adhesive film. The first adhesive layer 22 is used to firmly bond the light sources 2 and the light-transmitting substrate 1, so that the light sources 2 are not easy to fall off from the light-transmitting substrate 1 and are more stable.

Figure 9:
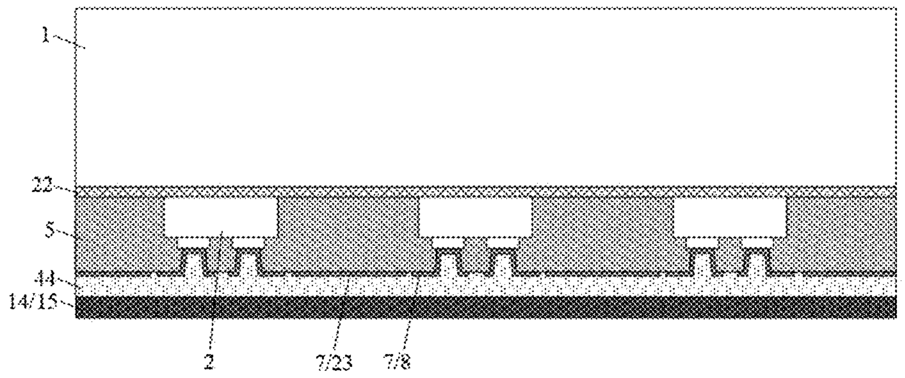
FIG. 9 is another schematic structural diagram of a backlight module according to an embodiment of the present disclosure.

FIG. 9 is another schematic structural diagram of a backlight module according to an embodiment of the present disclosure. In some embodiments, as shown in FIG. 9, the backlight module further includes a reflective electrode 23, and the reflective electrode 23 is located on a side of the first film layer 5 away from the light-transmitting substrate 1.

The reflective electrode 23 has a first orthographic projection on the plane where the light-transmitting substrate 1 is located, the light source 2 has a second orthographic projection on the plane where the light-transmitting substrate 1 is located, and at least part of the first orthographic projection is located between adjacent second orthographic projections.

Most of the light emitted by the light source 2 may pass through the light-transmitting substrate 1 in the light-emitting direction, but some of the light may be transmitted in the non-light emitting direction, that is, in a direction away from the light-transmitting substrate 1. After the reflective electrode 23 is provided, the reflective electrode 23 may be used to reflect the part of light transmitted in the non-light emitting direction, so that the reflected light may be transmitted through the light-transmitting substrate 1, so that the light utilization rate is improved, and the light-emitting efficiency of the backlight module is effectively improved.

Referring again to FIG. 9, in some embodiments, the reflective electrode 23 is located in the first metal layer 7.

On one hand, the reflective electrode 23 and the connection electrode 8 are formed by the same patterning process, and the process is simple. On the other hand, the reflective electrode 23 does not need to occupy the thickness of the film layer and does not affect the thickness of the module and the distance between the light source 2 and the bottom plate 15 of the frame 14, and the backlight module maintains a better thinning effect and heat dissipation effect.

Figure 10:
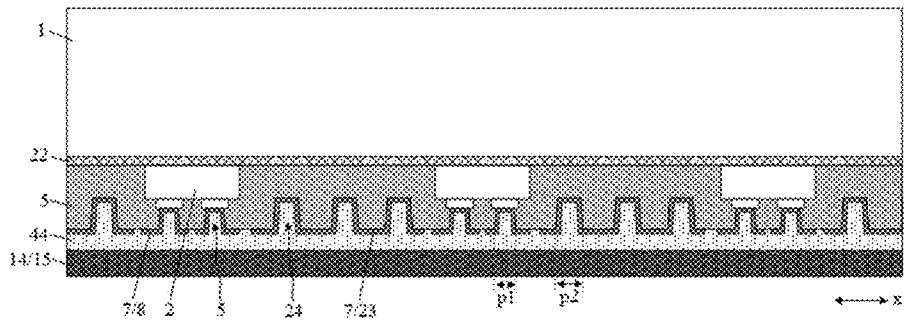
FIG. 10 is another schematic structural diagram of a backlight module according to an embodiment of the present disclosure.

FIG. 10 is another schematic structural diagram of a backlight module according to an embodiment of the present disclosure. In some embodiments, as shown in FIG. 10, a second recess 24 is further provided on a side of the first film layer 5 away from the light-transmitting substrate 1, the second recess 24 is recessed toward the light-transmitting substrate 1, and a depth of the second recess 24 is greater than or equal to a depth of the first recess 6.

At least part of the reflective electrode 23 is located in the second recess 24.

At the periphery of the light source 2, the second recess 24 with a greater depth is used to make the reflective electrode 23 have a higher inclined side surface or a higher vertical surface, so that more light emitted by the light source 2 in the non-light emitting direction can reach the reflective electrode 23 and be reflected by the reflective electrode 23 to exit through the light-transmitting substrate 1, thereby improving the light-emitting efficiency of the backlight module to a greater extent.

With respect to the second recess 24, in some embodiments, the second recess 24 and the first recess 6 may be formed by the same punching process, the first recess 6 and the second recess 24 use the same exposure amount, but since the first recess 6 has the electrode 4 blocking, the depth of the first recess 6 may be smaller, thereby achieving a depth difference between the first recess 6 and the second recess 24.

Referring again to FIG. 10, in some embodiments, a width p2 of the second recess 24 in the first direction x is greater than a width p1 of the first recess 6 in the first direction x, and the first direction x is parallel to the plane where the light-transmitting substrate 1 is located. The width p1 of the first recess 6 in the first direction x may be understood as a maximum width of the first recess 6 in the first direction x, and the width p2 of the second recess 24 in the first direction x may be understood as a maximum width of the second recess 24 in the first direction x.

In the first film layer 5, there is an included angle between the side wall of the recess and the surface connected to the recess, and under the condition that the included angle is fixed, an aperture of the second recess 24 is designed to be larger, so that the depth of the second recess 24 can be larger, and the second recess 24 better meets the depth design requirement.

Figure 11:
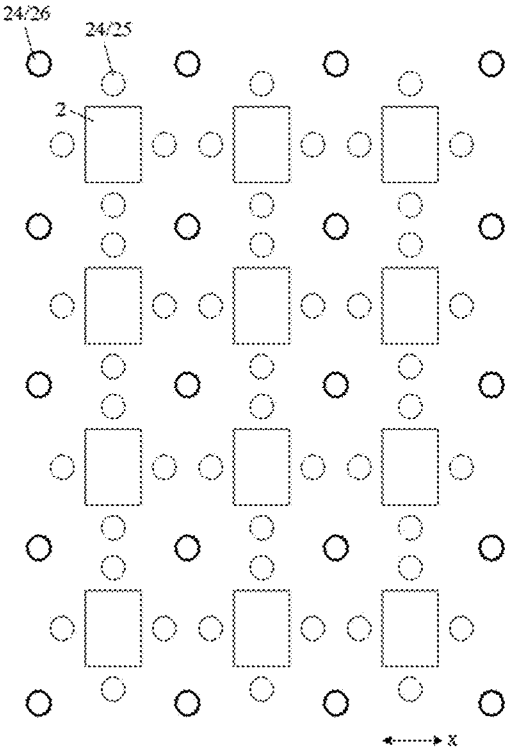
FIG. 11 is a top view of a backlight module according to an embodiment of the present disclosure.

FIG. 11 is a top view of a backlight module according to an embodiment of the present disclosure. In some embodiments, as shown in FIG. 11, second recesses 24 are provided on two opposite sides of the light source 2 in the first direction x, and the first direction x is parallel to the plane where the light-transmitting substrate 1 is located.

The second recesses 24 are provided on two opposite sides of the light source 2 in at least one direction, which can improve the consistency of the light emitting from the opposite sides of the light source 2 and optimize the light-emitting effect.

Referring again to FIG. 11, in some embodiments, a plurality of second recesses 24 are provided at the periphery of the light source 2.

The second recesses 24 in this structure may be designed in a scattered-point manner, the plurality of second recesses 24 are independent of each other, and most of the light transmitted around the light source 2 in the non-light emitting direction can be reflected back by the reflective electrode 23.

Figure 12:
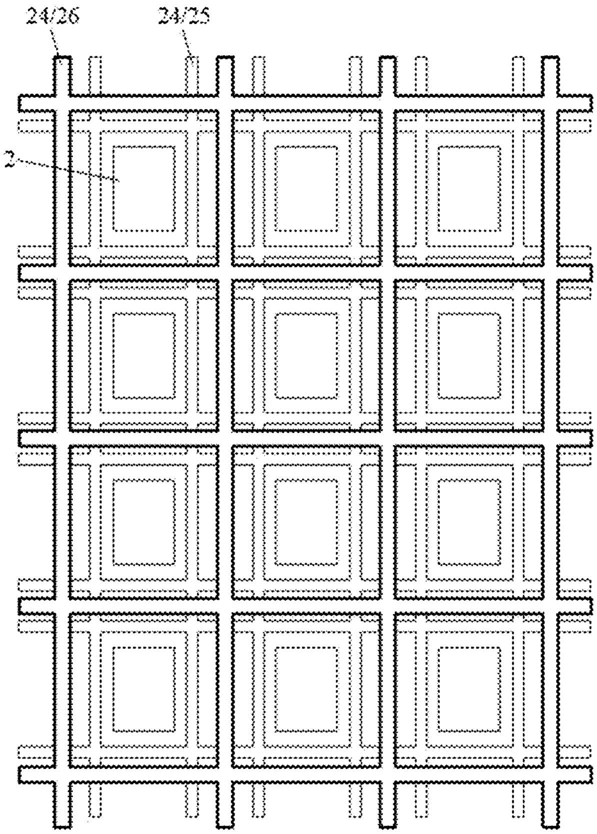
FIG. 12 is another top view of a backlight module according to an embodiment of the present disclosure.

Alternatively, in some other embodiments, as shown in FIG. 12, which is another top view of a backlight module according to an embodiment of the present disclosure, the second recess 24 is of a grid-like structure. In the direction perpendicular to the plane where the light-transmitting substrate 1 is located, the second recess 24 does not overlaps with the light source 2, that is, in the grid-like structure formed by the second recess 24, the grid strip of the grid-like structure does not overlap with the light source 2.

The second recess 24 in this structure can be a grid-like design, the second recess 24 surrounds the light source 2 in all directions, the light transmitted around the light source 2 in the non-light emitting direction can be reflected back by the reflective electrode 23, and the light-emitting efficiency of the backlight module is better.

Referring again to FIG. 10, in some embodiments, in order to reduce process complexity, different second recesses 24 may have the same depth.

Figure 13:
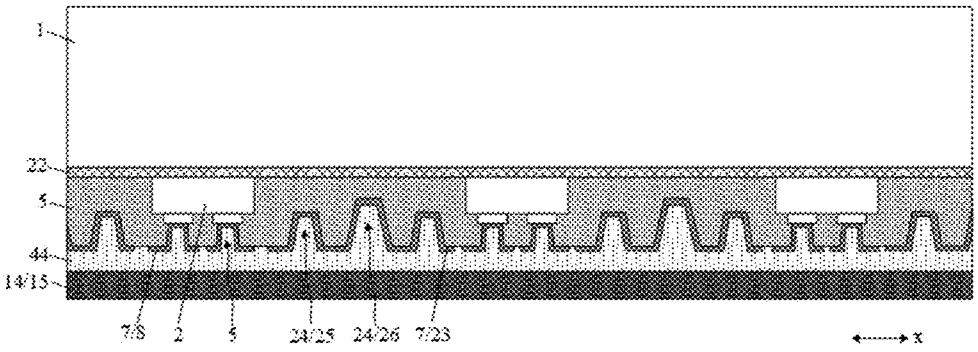
FIG. 13 is another schematic structural diagram of a backlight module according to an embodiment of the present disclosure.

Alternatively, in some embodiments, as shown in FIG. 13, which is another schematic structural diagram of a backlight module according to an embodiment of the present disclosure, the second recess 24 includes a first sub-recess 25 and a second sub-recess 26, and a depth of the second sub-recess 26 is greater than a depth of the first sub-recess 25.

The combination of the shallower first sub-recess 25 and the deeper second sub-recess 26 can enable the reflective electrode 23 to reflect more light, further optimizing the light emission of the backlight module. The first sub-recess 25 and the second sub-recess 26 may be formed in a same patterning process by using a half tone mask process.

Referring again to FIG. 13, in some embodiments, a distance between the second sub-recess 26 and the light source 2 is greater than a distance between the first sub-recess 25 and the light source 2.

In some embodiments, referring again to FIG. 11, the first sub-recess 25 and the second sub-recess 26 may both be of a scattered-point design, and a distance between the second sub-recess 26 and the light source 2 is greater than a distance between the first sub-recess 25 and the light source 2.

Alternatively, referring again to FIG. 12, the first sub-recess 25 and the second sub-recess 26 may both be of a grid-like design, and a distance between the second sub-recess 26 and the light source 2 is greater than a distance between the first sub-recess 25 and the light source 2. For example, the second recess 24 includes a second sub-recess 26 and a plurality of first sub-recesses 25, the second sub-recess 26 is a grid-like structure that is fully connected across the entire surface, one first sub-recess 25 corresponds to one light source 2, the first sub-recess 25 surrounds the corresponding light source 2, and adjacent first sub-recesses 25 are separated by the second sub-recess 26. Further, the first sub-recess 25 may be in communication with the second sub-recess 26.

The first sub-recess 25 and the second sub-recess 26 adopt this distribution design, when part of the light emitted by the light source 2 in the non-light emitting direction does not fall into the first sub-recess 25, the light may be further transmitted to the second sub-recess 26 to be reflected by the reflective electrode 23 in the second sub-recess 26 to exit in the light emitting direction, so that the reflection capability is enhanced.

Referring again to FIG. 13, in some embodiments, a width of the second sub-recess 26 in the first direction x is greater than a width of the first sub-recess 25 in the first direction x, and the first direction x is parallel to the plane where the light-transmitting substrate 1 is located.

In the first film layer 5, there is an included angle between the side wall of the second recess 24 and the surface connected thereto, and under the condition that the included angle is fixed, the aperture of the second sub-recess 26 is designed to be larger, and the second sub-recess 26 can has a greater depth, so that the second sub-recess 26 better meets the depth design requirement, thereby facilitating differential design of different second recesses 24.

Figure 14:
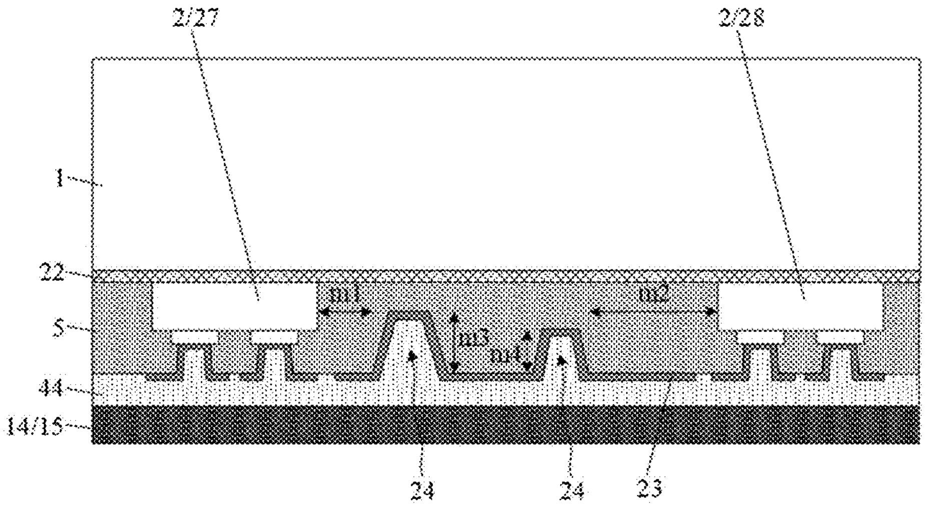
FIG. 14 is another schematic structural diagram of a backlight module according to an embodiment of the present disclosure.

FIG. 14 is another schematic structural diagram of a backlight module according to an embodiment of the present disclosure. In some embodiments, as shown in FIG. 14, the light sources 2 includes a first light source 27 and a second light source 28 of different light-emitting colors.

There is a first distance m1 between the first light source 27 and the most adjacent second recess 24, there is a second distance m2 between the second light source 28 and the most adjacent second recess 24, and the first distance m1 and the second distance m2 are different. Additionally/alternatively, the second recess 24 most adjacent to the first light source 27 has a first depth m3, the second recess 24 most adjacent to the second light source 28 has a second depth m4, and the first depth m3 is different from the second depth m4.

By performing differential design on the distances between different light sources 2 and the second recesses 24 adjacent thereto, and/or by performing differential design on the depths of the second recesses 24 adjacent to different light sources 2, the reflection degree of the light emitted by different light sources 2 through the reflective electrode 23 can be differentiated, and further, when the backlight module is applied in the display device, the light emission differences of the backlight module at different positions can be used to compensate for issues such as light leakage and color deviation of the display panel.

In some embodiments, the first distance m1 is less than the second distance m2, the first depth m3 is greater than the second depth m4, and the reflective electrode 23 reflects the light emitted by the first light source 27 to a greater degree, so that the light emission at the position of the first light source 27 is improved. Further, when the backlight module is applied to the display device, in one structure, in a direction perpendicular to a plane where the display device is located, the first light source 27 may overlap with the green sub-pixels in the display panel, and the second light source 28 may overlap with the red sub-pixels and the blue sub-pixels in the display panel. The green light contributes higher to the image brightness, and the first light source 27 is set to overlap with the green sub-pixels, so that the green sub-pixels can achieve higher light-emitting brightness, which helps to optimize the display effect.

Figure 15:
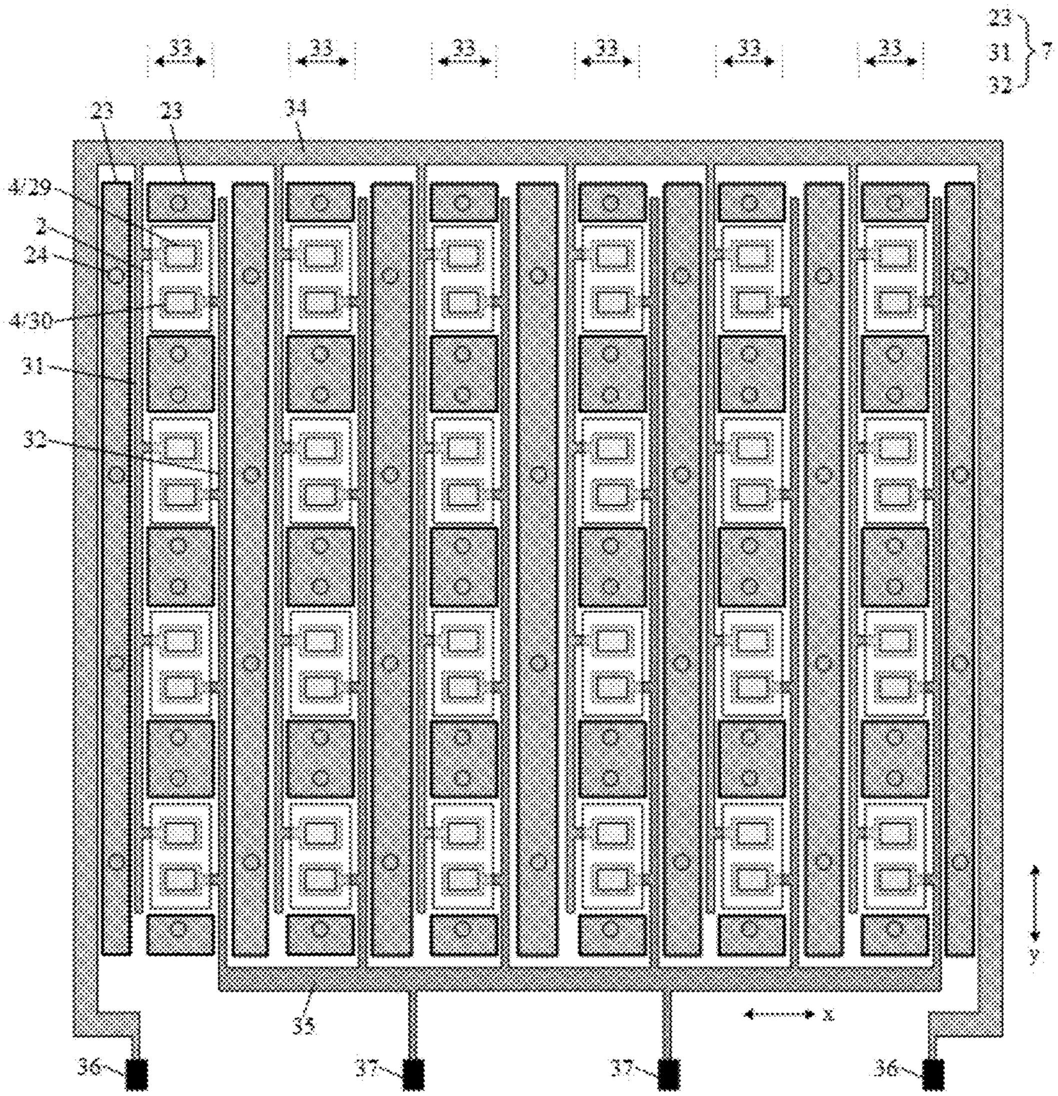
FIG. 15 is another top view of a backlight module according to an embodiment of the present disclosure.

FIG. 15 is another top view of a backlight module according to an embodiment of the present disclosure. In some embodiments, as shown in FIG. 15, the electrode 4 in the light source 2 includes a first electrode 29 and a second electrode 30, one of the first electrode 29 and the second electrode 30 is an anode, and the other is a cathode.

The first metal layer 7 further includes a first signal line 31 connected to the first electrode 29 and a second signal line 32 connected to the second electrode 30. The reflective electrode 23 is electrically insulated from the first signal line 31 and the second signal line 32.

In some embodiments, the backlight module includes a plurality of light source groups 33 arranged along the first direction x, and each light source group 33 includes a plurality of light sources 2 arranged along a second direction y. One light source group 33 is connected to one first signal line 31 and one second signal line 32, and the first signal line 31 and the second signal line 32 are respectively located on two opposite sides of the light source group 33. The plurality of first signal lines 31 may be connected to a first bus 34, and the first bus 34 is electrically connected to a first signal pin 36. The plurality of second signal lines 32 may be connected to a second bus 35, and the second bus 35 is electrically connected to a second signal pin 37.

In this structure, the first signal line 31 and the second signal line 32 are also located in the first metal layer 7, the patterning process is simple, and these signal lines do not need to additionally occupy the thickness of the film layer, which does not affect the thickness of the module and the heat dissipation capability. Moreover, the reflective electrode 23 under this design has independent functions from the first signal line 31 and the second signal line 32, and the reflective electrode 23 only performs a reflective function.

Further, in this structure, there is a gap between different reflective electrodes 23. An orthographic projection of at least some reflective electrodes 23 on the light-transmitting substrate 1 is located between orthographic projections of adjacent light sources 2 in the light source group 33 on the light-transmitting substrate 1, and/or an orthographic projection of at least some reflective electrodes 23 on the light-transmitting substrate 1 is located between orthographic projections of adjacent first signal line 31 and second signal line 32 on the light-transmitting substrate 1. Referring again to FIG. 15, when the second recesses 24 are provided, the second recesses 24 may have a scattered-point design or other spaced strip design, and the like.

Figure 16:
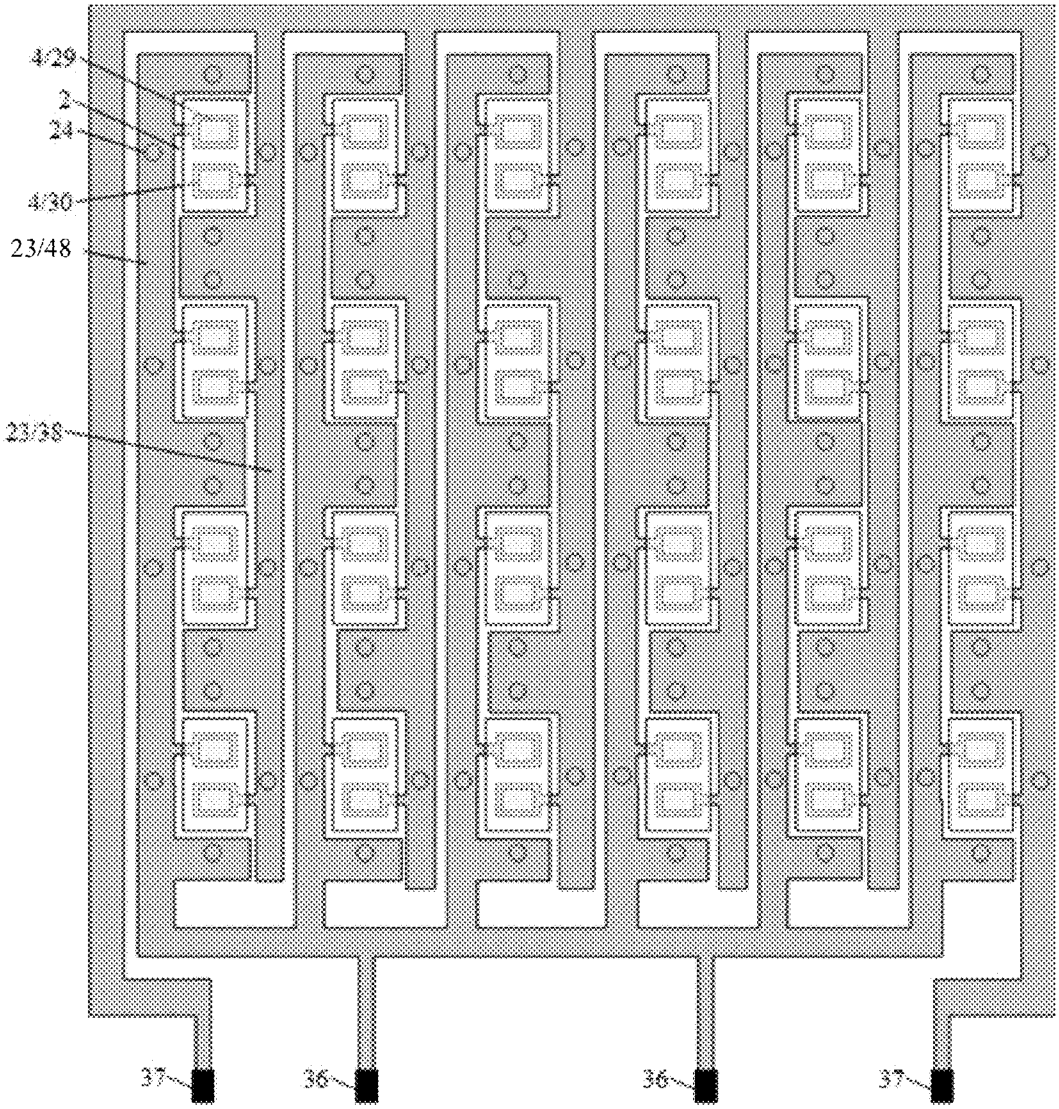
FIG. 16 is another top view of a backlight module according to an embodiment of the present disclosure.

FIG. 16 is another top view of a backlight module according to an embodiment of the present disclosure. Alternatively, in some other embodiments, as shown in FIG. 16, the electrode 4 in the light source 2 includes a first electrode 29 and a second electrode 30, one of the first electrode 29 and the second electrode 30 is an anode, and the other is a cathode.

The reflective electrode 23 includes a first reflective sub-electrode 48 connected to the first electrode 29 and a second reflective sub-electrode 38 connected to the second electrode 30, the first reflective sub-electrode 48 is further electrically connected to the first signal pin 36, the second reflective sub-electrode 38 is further electrically connected to the second signal pin 37, and the first reflective sub-electrode 48 is electrically insulated from the second reflective sub-electrode 38.

In this structure, the reflective electrode 23 has both the functions of reflecting light and transmitting anode signals and cathode signals, the spatial utilization rate of the reflective electrode 23 is high, the reflection area can be larger, and the anode signals and the cathode signals are also slightly attenuated during transmission.

Figure 17:
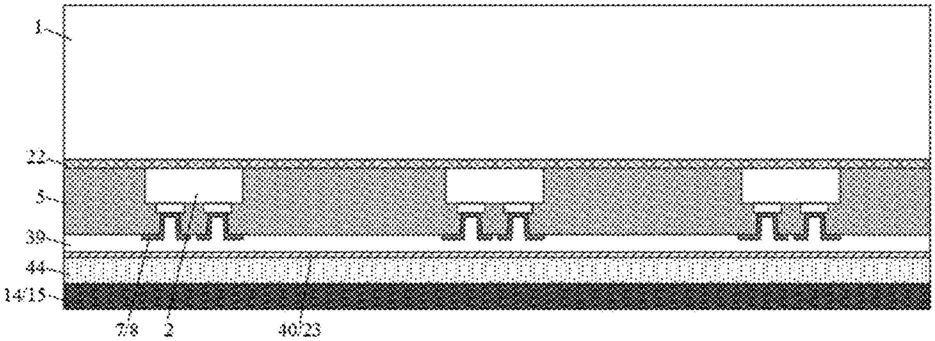
FIG. 17 is another schematic structural diagram of a backlight module according to an embodiment of the present disclosure.

FIG. 17 is another schematic structural diagram of a backlight module according to an embodiment of the present disclosure. In some embodiments, as shown in FIG. 17, the backlight module further includes an insulating layer 39 and a second metal layer 40. The insulating layer 39 is located on a side of the first metal layer 7 away from the light-transmitting substrate 1, and the second metal layer 40 is located on a side of the insulating layer away from the light-transmitting substrate 1.

The reflective electrode 23 is located in the second metal layer 40, and the first orthographic projection overlaps with the second orthographic projection.

In this way, the reflective electrode 23 occupies one metal layer alone, the reflective electrode 23 can achieve the whole layer coverage, and the reflection area reaches the maximum.

Figure 18:
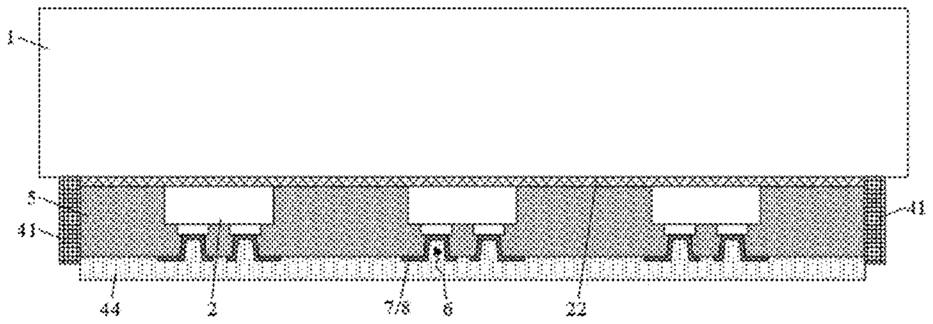
FIG. 18 is another schematic structural diagram of a backlight module according to an embodiment of the present disclosure.
Figure 19:
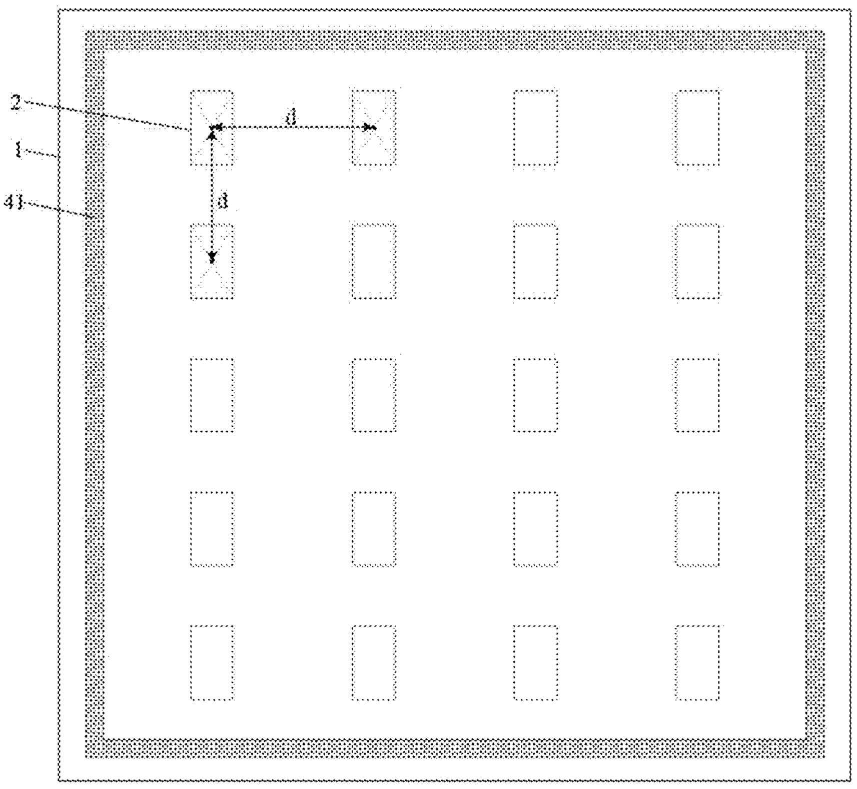
FIG. 19 is another top view of a backlight module according to an embodiment of the present disclosure.

FIG. 18 is another schematic structural diagram of a backlight module according to an embodiment of the present disclosure, and FIG. 19 is another top view of a backlight module according to an embodiment of the present disclosure. In some embodiments, as shown in FIG. 18 and FIG. 19, the backlight module further includes a barrier dam 41, and the barrier dam 41 is located at an edge of the light-transmitting substrate 1, and specifically, may be disposed around the edge of the light-transmitting substrate 1.

At least part of the first film layer 5, is located in the area surrounded by the barrier dam 41.

In this structure, at least part of the first film layer 5 may be formed by an inkjet printing process, and the film layer formed by inkjet printing may have a larger thickness, so that the requirement of the first film layer 5 for the thickness is met.

Referring again to FIG. 19, further, the orthographic projection of the light source 2 on the plane of the light-transmitting substrate 1 has a center point, and a distance d between the center points of the orthographic projections of adjacent light sources 2 is greater than or equal to 3 mm, so that sufficient dropping space is reserved for materials of the first film layer 5 during inkjet printing, which helps improve the flatness of the formed film layer.

Figure 20:
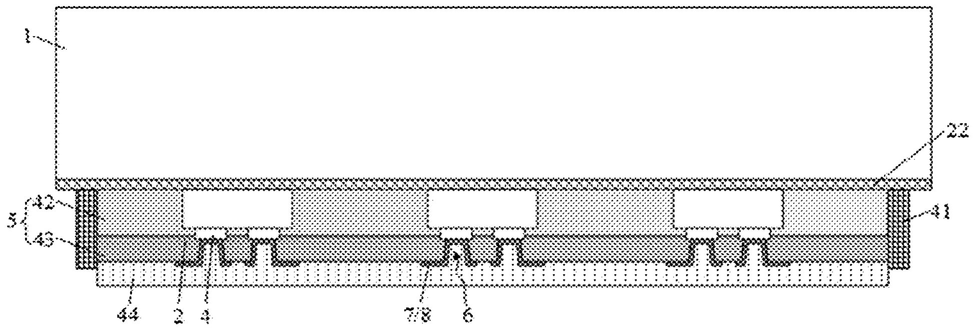
FIG. 20 is another schematic structural diagram of a backlight module according to an embodiment of the present disclosure.
Figure 21:
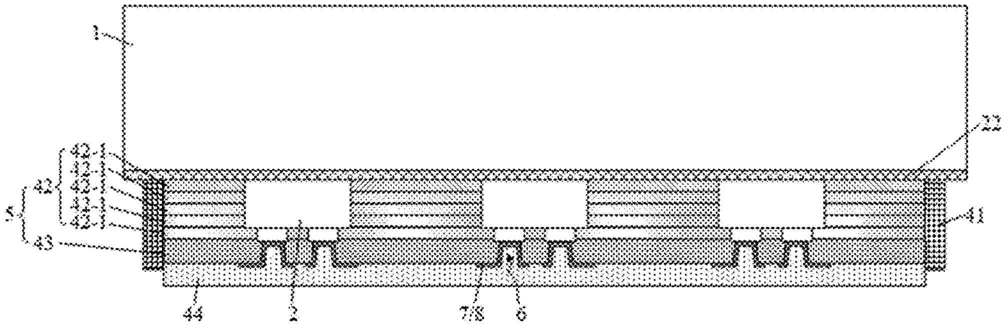
FIG. 21 is another schematic structural diagram of a backlight module according to an embodiment of the present disclosure.

FIG. 20 is another schematic structural diagram of a backlight module according to an embodiment of the present disclosure, and FIG. 21 is another schematic structural diagram of a backlight module according to an embodiment of the present disclosure. In some embodiments, as shown in FIG. 20 and FIG. 21, in combination with FIG. 19, the backlight module further includes a barrier dam 41, and the barrier dam 41 is located at an edge of the light-transmitting substrate 1, and specifically, the barrier dam 41 may be disposed around the edge of the light-transmitting substrate 1.

The first film layer 5 includes a first film sub-layer 42 and a second film sub-layer 43.

The first film sub-layer 42 is located within the area surrounded by the barrier dam 41. A distance between a surface of the first film sub-layer 42 away from the light-transmitting substrate 1 and the light-transmitting substrate 1 is less than a distance between a surface of the electrode 4 away from the light-transmitting substrate 1 and the light-transmitting substrate 1.

The second film sub-layer 43 is located on a side of the first film sub-layer 42 away from the light-transmitting substrate 1, a material of the second film sub-layer 43 is different from a material of the first film sub-layer 42, and the first recess 6 is located in the second film sub-layer 43.

In the above structure, the first film layer 5 includes the first film sub-layer 42 and the second film sub-layer 43 arranged in a stacked manner. The first film sub-layer 42 may be formed by the inkjet printing process, and the second film sub-layer 43 may include a photosensitive material, and is formed by a photolithography process.

The precision of the electrode 4 of the light source 2 is relatively high, while the high film thickness of the first film sub-layer 42 formed by the inkjet printing process is used to ensure the thickness requirement of the first film layer 5, the second film sub-layer 43 having the first recess 6 can be further formed on a side of the first film sub-layer 42 by using the photolithography process, the photolithography process precision is relatively high, the recess pattern formed by etching can better match the pattern of the electrode 4, so that the alignment precision of the first recess 6 and the electrode 4 is improved, and the connection reliability of the connection electrode 8 and the electrode 4 is improved.

The first film sub-layer 42 may be a single-layer film structure shown in FIG. 20, and the first film sub-layer 42 is formed by the inkjet printing process once.

Alternatively, the first film sub-layer 42 may also be a multi-layer film structure shown in FIG. 21, and the first film sub-layer 42 is formed by inkjet printing processes multiple times.

Figure 22:
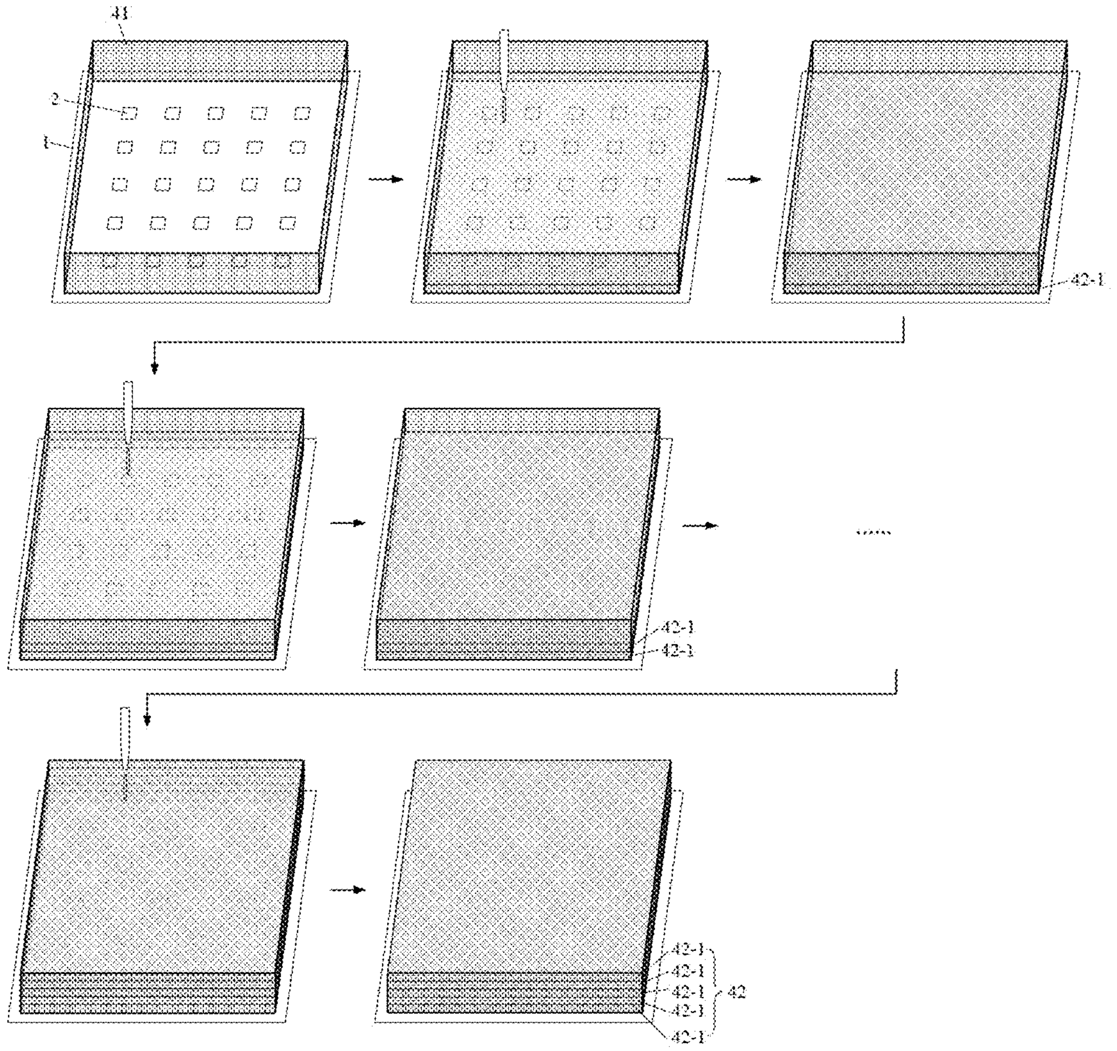
FIG. 22 is another process flowchart of a backlight module according to an embodiment of the present disclosure.

FIG. 22 is another process flowchart of a backlight module according to an embodiment of the present disclosure, and in combination with FIG. 21 and FIG. 22, the first film sub-layer 42 includes a plurality of film sub-layers 42-1 stacked along a direction perpendicular to the light-transmitting substrate 1, and each film sub-layer 42-1 is formed by the inkjet printing process once. That is, the forming process of the first film sub-layer 42 includes a process of spraying materials, leveling and curing for multiple times, and after the material is sprayed and leveled each time, the small step differences at the bottom can be filled, so that the total error of the thickness of the first film sub-layer 42 can be converted from a single large fluctuation to an average effect of multiple small fluctuations. For example, when a film layer with a thickness of 20 nm is formed by spraying and curing, the thickness error is ±2 μm, but when 5 film layers are superimposed to form a total filled thickness of 100 nm through the inkjet printing process for 5 times, the thickness error of the film layer of 100 nm is also only about ±2 μm.

In this way, the error of the total thickness of the first film layer 5 can be significantly reduced, which helps to improve the flatness of the film layer. Further, when the reflective electrode 23 is disposed on the side of the first film layer 5 away from the light-transmitting substrate 1, the height consistency of the reflective electrode 23 at different positions can be improved, thereby effectively improving the reflection uniformity at different positions.

In addition, in the forming process of the barrier dam 41, a circle of edge adhesive is first applied, after the edge adhesive is coated and cured, and the barrier dam 41 with a height of 100 μm can be formed. At present, a thickness of the LED chip is usually 50 μm to 300 μm, and the barrier dam 41 with a filling height of 100 μm is sufficient to meet the thickness requirement of the common LED chip for the first film sub-layer 42.

Referring to FIG. 20 and FIG. 21 again, further, a distance between a surface of the barrier dam 41 away from the light-transmitting substrate 1 and the light-transmitting substrate 1 is greater than or equal to a distance between a surface of the first film sub-layer 42 away from the light-transmitting substrate 1 and the light-transmitting substrate 1, so that in the process of jetting the materials of the first film sub-layer 42, the sprayed materials are better restricted to flow in the area surrounded by the barrier dam 41, the material overflow is avoided, and the structural reliability of the first film sub-layer 42 is improved.

In some embodiments, a film thickness of the second film sub-layer 43 is greater than 10 μm, the film thickness refers to a thickness of the second film sub-layer 43 at a position outside the first recess 6.

The light sources 2 in the backlight module are mostly LED chips, and a thickness tolerance of the LED chips is usually 3 μm to 5 μm. The curing shrinkage rate difference of the first adhesive layer 22 is about ±2 μm, so the height error of the overall structure formed by the light sources 2 and the first adhesive layer 22 is 1 μm to 7 μm. When the first film sub-layer 42 is formed to have the thickness of 100 μm by using an inkjet printing process, a thickness error is about ±2 μm, and when superimposing the height error of the integral structure formed by the light sources 2 and the first adhesive layer 22, the maximum total error is about 9 μm. Therefore, a thickness of the second film sub-layer 43 is designed to be greater than 10 μm, and the thickness of the second film sub-layer 43 can be used to compensate for the step difference at different positions, so that the flatness of the film layer is improved.

Referring again to FIG. 2, in a feasible implementation, the backlight module further includes the second film layer 44 and the frame 14. The second film layer 44 is located on a side of the first metal layer 7 away from the light-transmitting substrate 1. The frame 14 includes a bottom plate 15, and the bottom plate 15 is located on a side of the second film layer 44 away from the light-transmitting substrate 1.

The second film layer 44 is an adhesive layer, a surface of the second film layer 44 adjacent to the light-transmitting substrate 1 is in contact with the first metal layer 7, and a surface of the second film layer 44 adjacent to the bottom plate 15 is in contact with the bottom plate 15.

When the light sources 2 are disposed on the side of the light-transmitting substrate 1 facing away from the light-emitting side of the backlight module, in the implementation shown in FIG. 6, the light sources 2 are first formed on the carrier substrate 16, and after the third insulating layer 20 is bonded and fixed to the light-transmitting substrate 1, the carrier substrate 16 is peeled off. In order to be able to peel off the carrier substrate 16, this structure needs to be provided with a peeling layer 17. After the carrier substrate 16 is peeled off, when the peeling layer 17 is bonded to the frame 14, an additional adhesive layer 21 needs to be formed, so that a structure of at least three layers of the first insulating layer 60, the peeling layer 17 and the adhesive layer 21 needs to be spaced between the first metal layer 7 and the frame 14. Even when the carrier substrate 16 is peeled off, and the peeling layer 17 is removed along with the carrier substrate 16, the first insulating layer 60 also needs to be bonded to the frame 14 through the adhesive layer 21, and a structure of at least two layers of the first insulating layer 60 and the adhesive layer 21 needs to be spaced between the first metal layer 7 and the frame 14.

However, in the structure having the first film layer 5, since the carrier substrate 16 is not required, and correspondingly, the peeling layer 17 is not required, as shown in FIG. 2, only one adhesive second film layer 44 needs to be spaced between the first metal layer 7 and the frame 14, a thickness of the backlight module can be smaller, and the light sources 2 are closer to the bottom plate 15 of the frame 14, so that the heat generated by the light sources 2 can be transferred to the bottom plate 15 more quickly and dissipated.

Referring again to FIG. 2, in some embodiments, the backlight module further includes the second film layer 44, and the second film layer 44 is located on the side of the first metal layer 7 away from the light-transmitting substrate 1. A film thickness of the second film layer 44 is less than a film thickness of the first film layer 5.

The first film layer 5 plays a role of planarization, the second film layer 44 plays a role of insulation and bonding, and compared with the first film layer 5, the thickness of the second film layer 44 is set to be smaller, which helps to further optimize the thickness of the backlight module and the heat dissipation.

Referring to FIG. 3 again, in some embodiments, the backlight module further includes an optical assembly 9, the optical assembly 9 is located on a side of the light-transmitting substrate 1 away from the light sources 2, and a support assembly 13 is spaced between the optical assembly 9 and the light-transmitting substrate 1.

The optical assembly 9 may specifically include the diffusion film 10, the brightness enhancement film 11, the dual brightness enhancement film 12, and the like. An air gap is formed between the light-transmitting substrate 1 and the optical assembly 9 by the support assembly 13, at this time, a thickness of the light-transmitting substrate 1 and a height of the air gap jointly form the optical distance OD, so that the optical distance OD can be larger to enhance light uniformity effect.

In addition, the frame 14 may further include a side plate connected to the bottom plate 15, and the side plate may completely cover the side surfaces of the light-transmitting substrate 1 and the optical assembly 9 as shown in FIG. 3, or may only cover part of the side surface of the light-transmitting substrate 1 as shown in FIG. 2, which is not specifically limited in the present disclosure.

Based on the same inventive concept, embodiments of the present disclosure further provide a method for manufacturing a backlight module, which is used for forming the above backlight module.

In combination with FIG. 2 and FIG. 7, the manufacturing method includes the following steps:

- L1: providing light sources 2 on a side of the light-transmitting substrate 1, where each of the light sources 2 includes a light-emitting surface 3 and the electrode 4, and the electrode 4 is located on the side of the light-emitting surface 3 away from the light-transmitting substrate 1.
- L2: forming a first film layer 5 on the same side of the light-transmitting substrate 1 as the light sources 2, where a distance between a surface of the first film layer 5 away from the light-transmitting substrate 1 and the light-transmitting substrate 1 is greater than a distance between a surface of the electrode 4 away from the light-transmitting substrate 1 and the light-transmitting substrate 1, the first film layer 5 is provided with a first recess 6 on a side away from the light-transmitting substrate 1, and at least part of the electrode 4 is exposed by the first recess 6.
- L3: forming a first metal layer 7 on the side of the first film layer 5 away from the light-transmitting substrate 1, where the first metal layer 7 includes the connection electrode 8, and the connection electrode 8 is electrically connected to the electrode 4 of the light source 2 in the first recess 6.

In the backlight module formed by this method, the light-transmitting substrate 1 is located on the side of the light source 2 facing the light-emitting side of the backlight module, and referring to FIG. 3 and FIG. 4, the thickness of the light-transmitting substrate 1 can be reused as at least part of the optical distance OD. In addition, the part of the thickness that was originally occupied by the light-transmitting substrate 1 below the light sources 2 can also be freed up, and the freed up part of the thickness can be used to reduce the thickness of the module, so that the module has a thinner design and/or the freed up part of the thickness can be used to increase the optical distance OD, so that the optical distance OD is larger while the module is thinned, thereby achieving better light uniformity effect.

In addition, referring to FIG. 2, the light source 2 and the bottom plate 15 of the frame 14 are no longer separated by the light-transmitting substrate 1, the first film layer 5 and the first metal layer 7 separated between the light source 2 and the bottom plate 15 are only film structures, and their thicknesses are much smaller than the thickness of the substrate. The heat generated by the light source 2 only needs to transmit a short distance downward to be conducted to the bottom plate 15, and then dissipated through the frame 14, which improves heat dissipation efficiency, enables the backlight module to achieve better heat dissipation performance.

Figure 23:
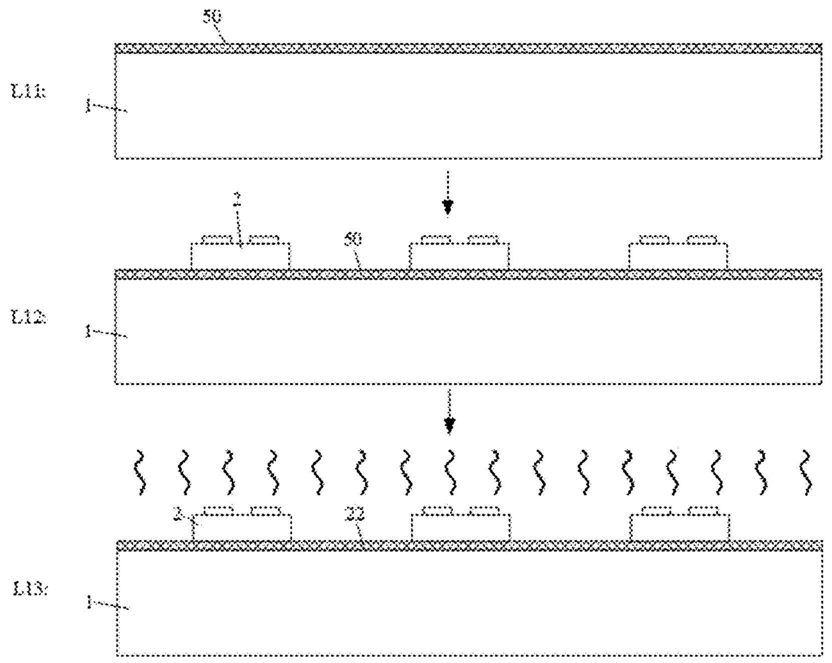
FIG. 23 is another process flowchart of a backlight module according to an embodiment of the present disclosure.

FIG. 23 is another process flowchart of a backlight module according to an embodiment of the present disclosure. In some embodiments, as shown in FIG. 23, L1: providing the light sources 2 on the side of the light-transmitting substrate 1 includes the following steps.

- L11: coating an adhesive material 50 on the side of the light-transmitting substrate 1, where the adhesive material 50 may include an epoxy resin adhesive and the like.
- L12: bonding the light sources 2 and the adhesive material 50.
- L13: curing the adhesive material 50 to form a first adhesive layer 22, where the curing method may be thermal curing and the like.

The first adhesive layer 22 is used to firmly bond the light sources 2 to the light-transmitting substrate 1, and the light sources 2 are not easily detached from the light-transmitting substrate 1, so that the stability of the light sources 2 is enhanced.

In combination with FIGS. 20 to 22, the first film layer 5 includes the first film sub-layer 42 and the second film sub-layer 43.

Figure 24:
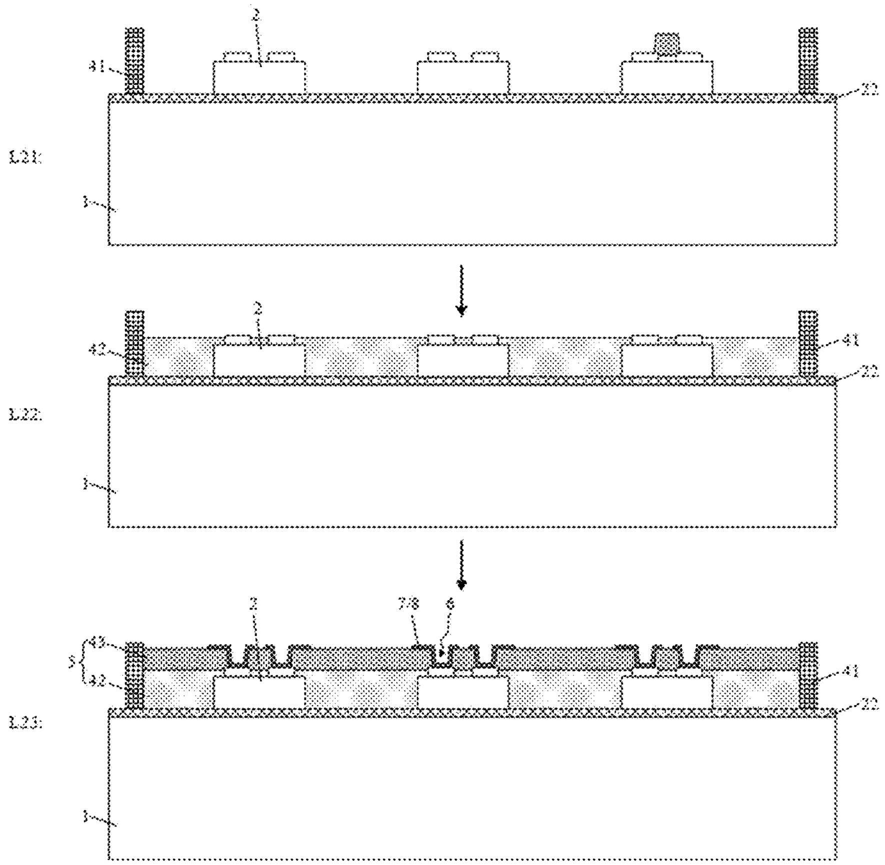
FIG. 24 is another process flowchart of a backlight module according to an embodiment of the present disclosure.

FIG. 24 is another process flowchart of a backlight module according to an embodiment of the present disclosure. In some embodiments, as shown in FIG. 24, the process of L2 includes the following steps.

- L21: forming a barrier dam 41 on a side of the light-transmitting substrate 1, where the barrier dam 41 is located at an edge of the light-transmitting substrate 1.
- L22: forming the first film sub-layer 42 within an area surrounded by the barrier dam 41 through an inkjet printing process, where a distance between a surface of the first film sub-layer 42 away from the light-transmitting substrate 1 and the light-transmitting substrate 1 is less than a distance between a surface of the electrode 4 away from the light-transmitting substrate 1 and the light-transmitting substrate 1.
- L23: coating a photosensitive material on the first film sub-layer 42 and patterning the photosensitive material to form the second film sub-layer 43 having the first recess 6.

The precision of the electrode 4 of the light source 2 is relatively high, while the high film thickness of the first film sub-layer 42 formed by the inkjet printing process is used to ensure the thickness requirement of the first film layer 5, the second film sub-layer 43 having the first recess 6 can be further formed on a side of the first film sub-layer 42 by using the photolithography process, the photolithography process precision is relatively high, the recess pattern formed by etching can better match the pattern of the electrode 4, so that the alignment precision of the first recess 6 and the electrode 4 is improved, and the connection reliability of the connection electrode 8 and the electrode 4 is improved.

The process of L22 may include inkjet printing process only for one time. Alternatively, as shown in FIG. 22, The inkjet printing process may be performed for multiple times, that is, the forming process of the first film sub-layer 42 includes a process of spraying materials, leveling and curing for multiple times, and after the material is sprayed and leveled each time, the small step difference at the bottom can be filled, so that the total error of the thickness of the first film sub-layer 42 can be converted from a single large fluctuation to an average effect of multiple small fluctuations. In this way, the error of the total thickness of the first film layer 5 can be significantly reduced, which helps to improve the flatness of the film layer. Further, when the reflective electrode 23 is disposed on the side of the first film layer 5 away from the light-transmitting substrate 1, the height consistency of the reflective electrode 23 at different positions can be improved, thereby effectively improving the reflection uniformity at different positions.

Figure 25:
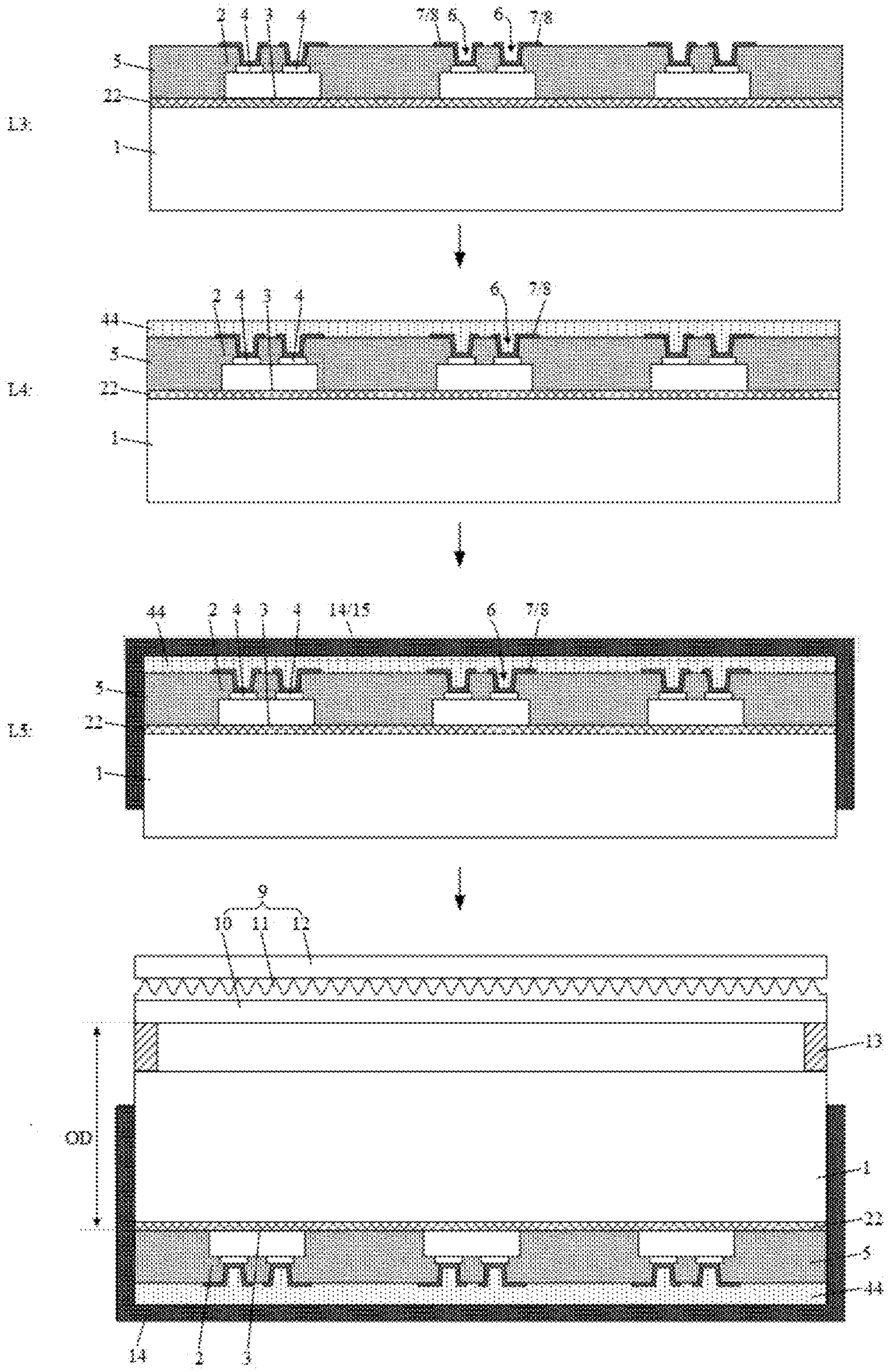
FIG. 25 is another process flowchart of a backlight module according to an embodiment of the present disclosure.

FIG. 25 is another process flowchart of a backlight module according to an embodiment of the present disclosure. In some embodiments, as shown in FIG. 25, after L3, the manufacturing method further includes the following steps.

L4: forming a second film layer 44, where the second film layer 44 is an adhesive layer, and the surface of the second film layer 44 adjacent to the light-transmitting substrate 1 is in contact with and bonded to the first metal layer 7.

L5: bonding the frame 14, where the frame 14 includes a bottom plate 15, and the surface of the second film layer 44 adjacent to the bottom plate 15 is in contact with and bonded to the bottom plate 15.

When the light sources 2 are disposed on the side of the light-transmitting substrate 1 facing away from the light-emitting side of the backlight module, in the implementation shown in FIG. 6, the light sources 2 are first formed on the carrier substrate 16, and after the third insulating layer 20 is bonded and fixed to the light-transmitting substrate 1, the carrier substrate 16 is peeled off. In order to be able to peel off the carrier substrate 16, this structure needs to be provided with a peeling layer 17, and after the carrier substrate 16 is peeled off, when the peeling layer 17 is bonded to the frame 14, an additional adhesive layer 21 needs to be formed, so that a structure of at least three layers of the first insulating layer 60, the peeling layer 17 and the adhesive layer 21 needs to be spaced between the first metal layer 7 and the frame 14. Even when the carrier substrate 16 is peeled off, and the peeling layer 17 is removed along with the carrier substrate 16, the first insulating layer 60 also needs to be bonded to the frame 14 through one adhesive layer 21, and a structure of at least two layers of the first insulating layer 60 and the adhesive layer 21 needs to be spaced between the first metal layer 7 and the frame 14.

However, in the structure having the first film layer 5, since the carrier substrate 16 is not required, and correspondingly, the peeling layer 17 is not required, as shown in FIG. 2, only one adhesive second film layer 44 needs to be spaced between the first metal layer 7 and the frame 14, a thickness of the backlight module can be smaller, and the light sources 2 are closer to the bottom plate 15 of the frame 14, so that the heat generated by the light sources 2 can be transferred to the bottom plate 15 more quickly and dissipated.

Referring again to FIG. 25, further, after L5, the method further includes the following steps.

L6: turning over the formed structure so that the side of the light-transmitting substrate 1 away from the light sources 2 faces upward, and providing a support assembly 13 and an optical assembly 9 on the side of the light-transmitting substrate 1 away from the light sources 2, where the support assembly 13 is spaced between the optical assembly 9 and the light-transmitting substrate 1.

The optical assembly 9 may specifically include the diffusion film 10, the brightness enhancement film 11, the dual brightness enhancement film 12, and the like. The air gap is formed between the light-transmitting substrate 1 and the optical assembly 9 by the support assembly 13, at this time, the thickness of the light-transmitting substrate 1 and the height of the air gap jointly form the optical distance OD, so that the optical distance OD can be larger to enhance light uniformity effect of the backlight module.

Based on the same concept, embodiments of the present disclosure further provide a display device.

Figure 26:
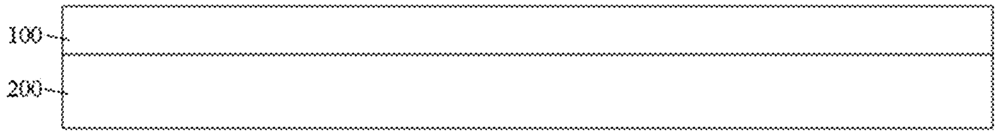
FIG. 26 is a schematic structural diagram of a display device according to an embodiment of the present disclosure.
Figure 27:
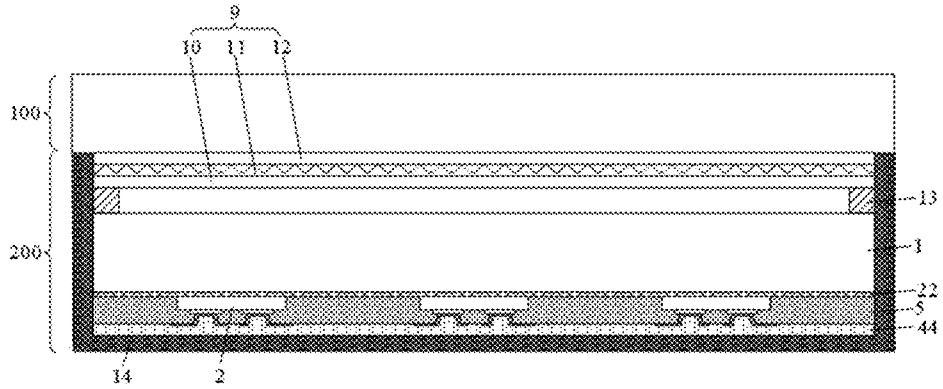
FIG. 27 is another schematic structural diagram of a display device according to an embodiment of the present disclosure.

FIG. 26 is a schematic structural diagram of a display device according to an embodiment of the present disclosure, and FIG. 27 is another schematic structural diagram of a display device according to an embodiment of the present disclosure. As shown in FIG. 26 and FIG. 27, the display device includes a display panel 100 and the above backlight module 200. The display panel may specifically be a liquid crystal display (LCD) panel. In the backlight module 200, and the light sources 2 are located on a side of the light-transmitting substrate 1 away from the display panel 100.

It should be understood that the display devices shown in FIG. 26 and FIG. 27 are merely illustrative, and the display device may be any electronic device having a display function such as a mobile phone, a tablet computer, a notebook computer, an e-book, and a television.

The above description merely illustrates some preferred embodiments of the present disclosure and is not intended to limit the present disclosure, and any modification, equivalent substitution, improvement and the like made within a spirit and a principle of the present disclosure shall fall with the scope of the present disclosure.

Finally, it should be noted that: the above embodiments are merely used to illustrate the technical solutions of the present disclosure, but not to limit the same. Although the present disclosure has been described in detail with reference to the above embodiments, those skilled in the art should understand that the technical solutions described in the above embodiments of the present disclosure may still be modified, or some or all of the technical features may be equivalently replaced. These modifications or substitutions do not make the essence of the corresponding technical solutions depart from the scope of the technical solutions in the embodiments of the present disclosure.

What is claimed is:

1. A backlight module, comprising:

a light-transmitting substrate;

a plurality of light sources located on a side of the light-transmitting substrate, wherein the plurality of light sources respectively comprise a light-emitting surface and an electrode, wherein the electrode is located on a side of the light-emitting surface away from the light-transmitting substrate;

a first film layer located on a same side of the light-transmitting substrate as the plurality of light sources, wherein a distance between a surface of the first film layer away from the light-transmitting substrate and the light-transmitting substrate is greater than a distance between a surface of the electrode away from the light-transmitting substrate and the light-transmitting substrate, wherein the first film layer comprises a first recess on a side away from the light-transmitting substrate, and wherein at least part of the electrode is exposed by the first recess; and a first metal layer disposed on a side of the first film layer away from the light-transmitting substrate, wherein the first metal layer comprises a connection electrode, and wherein the connection electrode is electrically connected to the electrode in the first recess.

2. The backlight module according to claim 1, wherein, a width of the first recess in a first direction is smaller than a width of the electrode in the first direction, and the first direction is parallel to a plane of the light-transmitting substrate; and/or, in a direction perpendicular to the plane of the light-transmitting substrate, a sidewall of the first recess overlaps with the electrode.

3. The backlight module according to claim 1, wherein a first adhesive layer is provided between the plurality of light sources and the light-transmitting substrate.

4. The backlight module according to claim 1, further comprising:

a reflective electrode located on a side of the first film layer away from the light-transmitting substrate, wherein the reflective electrode has a first orthographic projection on a plane of the light-transmitting substrate, wherein the plurality of light sources respectively comprise a second orthographic projection on the plane of the light-transmitting substrate, and at least part of the first orthographic projection is located between adjacent second orthographic projections.

5. The backlight module according to claim 4, wherein the reflective electrode is located in the first metal layer; and wherein the first film layer is further provided with a second recess on the side away from the light-transmitting substrate, a depth of the second recess is greater than or equal to a depth of the first recess, and at least part of the reflective electrode is located in the second recess.

6. The backlight module according to claim 5, wherein a width of the second recess in the first direction is greater than a width of the first recess in the first direction, and the first direction is parallel to the plane of the light-transmitting substrate.

7. The backlight module according to claim 5, wherein second recesses are provided on two opposite sides of one light source of the plurality of light sources in the first direction, and the first direction is parallel to the plane of the light-transmitting substrate.

8. The backlight module according to claim 5, wherein a plurality of second recesses are provided at a periphery of one light source of the plurality of light sources; and/or wherein the second recess has a grid-like structure; and/or wherein different second recesses have a same depth.

9. The backlight module according to claim 5, wherein the second recess comprises a first sub-recess and a second sub-recess, and a depth of the second sub-recess is greater than a depth of the first sub-recess.

10. The backlight module according to claim 9, wherein a distance between the second sub-recess and the plurality of light sources is greater than a distance between the first sub-recess and the plurality of light sources; or wherein a width of the second sub-recess in the first direction is greater than a width of the first sub-recess in the first direction, and the first direction is parallel to the plane of the light-transmitting substrate.

11. The backlight module according to claim 5, wherein the plurality of light sources comprise a first light source and a second light source of different light-emitting colors, wherein a first distance is provided between the first light source and the most adjacent second recess, a second distance is provided between the second light source and the most adjacent second recess, and the first distance is different from the second distance; and/or the second recess most adjacent to the first light source has a first depth, the second recess most adjacent to the second light source has a second depth, and the first depth is different from the second depth.

12. The backlight module according to claim 5, wherein, the electrode in one light source of the plurality of light sources comprises a first electrode and a second electrode;

the first metal layer further comprises a first signal line connected to the first electrode and a second signal line connected to the second electrode; and the reflective electrode is electrically insulated from the first signal line and the second signal line.

13. The backlight module according to claim 5, wherein, the electrode in one light source of the plurality of light sources comprises a first electrode and a second electrode; and the reflective electrode comprises a first reflective sub-electrode connected to the first electrode and a second reflective sub-electrode connected to the second electrode, the first reflective sub-electrode is further electrically connected to a first signal pin, the second reflective sub-electrode is further electrically connected to a second signal pin, and the first reflective sub-electrode is electrically insulated from the second reflective sub-electrode.

14. The backlight module according to claim 4, further comprising:

an insulating layer located on a side of the first metal layer away from the light-transmitting substrate; and a second metal layer located on a side of the insulating layer away from the light-transmitting substrate, wherein the reflective electrode is located in the second metal layer, and the first orthographic projection overlaps with the second orthographic projection.

15. The backlight module according to claim 1, further comprising:

a barrier dam located at an edge of the light-transmitting substrate, wherein at least part of the first film layer is located within an area surrounded by the barrier dam; and wherein orthographic projections of the plurality of light sources on a plane of the light-transmitting substrate respectively have a center point, and a distance between center points of the orthographic projections of adjacent light sources is greater than or equal to 3 mm.

16. The backlight module according to claim 1, further comprising:

a barrier dam located at an edge of the light-transmitting substrate, wherein the first film layer comprises a first film sub-layer and a second film sub-layer, wherein the first film sub-layer is located within an area surrounded by the barrier dam, and a distance between a surface of the first film sub-layer away from the light-transmitting substrate and the light-transmitting substrate is less than a distance between the surface of the electrode away from the light-transmitting substrate and the light-transmitting substrate; and the second film sub-layer is located on a side of the first film sub-layer away from the light-transmitting substrate, a material of the second film sub-layer is different from a material of the first film sub-layer, and the first recess is provided in the second film sub-layer.

17. The backlight module according to claim 16, wherein a distance between a surface of the barrier dam away from the light-transmitting substrate and the light-transmitting substrate is greater than or equal to the distance between the surface of the first film sub-layer away from the light-transmitting substrate and the light-transmitting substrate; and/or wherein a film thickness of the second film sub-layer is greater than 10 μm.

18. The backlight module according to claim 1, wherein the backlight module further comprises:

a second film layer and a frame, wherein the second film layer is located on a side of the first metal layer away from the light-transmitting substrate, the frame comprises a bottom plate located on a side of the second film layer away from the light-transmitting substrate, the second film layer is an adhesive layer, a surface of the second film layer adjacent to the light-transmitting substrate is in contact with the first metal layer, and a surface of the second film layer adjacent to the bottom plate is in contact with the bottom plate; or wherein the backlight module further comprises:

a second film layer located on a side of the first metal layer away from the transparent substrate, wherein a film thickness of the second film layer is less than a film thickness of the first film layer.

19. The backlight module according to claim 1, further comprising:

an optical assembly located on a side of the light-transmitting substrate away from the plurality of light sources; and a support assembly spaced between the optical assembly and the light-transmitting substrate.

20. A display device, comprising a display panel and the backlight module according to claim 1.

* * * * *